United States Patent
Chai et al.

(10) Patent No.: US 11,039,418 B2
(45) Date of Patent: Jun. 15, 2021

(54) METHOD FOR PROCESSING SYSTEM MESSAGE, NETWORK DEVICE, AND USER TERMINAL

(71) Applicant: HUAWEI TECHNOLOGIES CO., LTD., Guangdong (CN)

(72) Inventors: Li Chai, Beijing (CN); Jian Zhang, Beijing (CN); Wei Quan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/040,156

(22) Filed: Jul. 19, 2018

(65) Prior Publication Data

US 2018/0324757 A1 Nov. 8, 2018

Related U.S. Application Data

(63) Continuation of application No. PCT/CN2016/071745, filed on Jan. 22, 2016.

(51) Int. Cl.
*H04W 68/02* (2009.01)
*H04W 88/02* (2009.01)
(Continued)

(52) U.S. Cl.
CPC ............. *H04W 68/02* (2013.01); *H04W 4/70* (2018.02); *H04W 48/12* (2013.01); *H04W 56/00* (2013.01);
(Continued)

(58) Field of Classification Search
CPC . H04W 68/02; H04W 88/023; H04W 56/001; H04W 76/27; H04W 76/28;
(Continued)

(56) References Cited

U.S. PATENT DOCUMENTS

2007/0168508 A1 7/2007 Wang et al.
2009/0181661 A1* 7/2009 Kitazoe ................ H04W 48/12
455/418
(Continued)

FOREIGN PATENT DOCUMENTS

CN 1564483 A 1/2005
CN 101911786 A 12/2010
(Continued)

OTHER PUBLICATIONS

Huawei Small Cell Solution,Huawei Technologies Co., Ltd,dated Mar. 20, 2014,total 37 pages.
(Continued)

*Primary Examiner* — Minjung Kim

(57) ABSTRACT

Example methods for processing a system message and network devices are described herein. One example method includes obtaining, by a user terminal, indication information, wherein the indication information indicates that a system message of a cell cluster has changed or whether a system message of a cell cluster has changed, wherein the cell cluster comprises a set of at least one cell. The user terminal can then determine whether currently used information about the cell cluster needs to be updated. In some instances, obtaining the indication information comprises obtaining a system information update message. In those instances, determining whether currently used information about the cell cluster needs to be updated can include updating the currently used information about the cell cluster or updating a system message of a cell in the currently used cell cluster based on the indication information in the system information update message.

6 Claims, 7 Drawing Sheets

(51) Int. Cl.
*H04W 76/28* (2018.01)
*H04W 76/27* (2018.01)
*H04W 56/00* (2009.01)
*H04W 4/70* (2018.01)
*H04W 48/12* (2009.01)
*H04W 4/90* (2018.01)

(52) U.S. Cl.
CPC ......... *H04W 56/001* (2013.01); *H04W 76/27* (2018.02); *H04W 76/28* (2018.02); *H04W 88/023* (2013.01); *H04W 4/90* (2018.02)

(58) Field of Classification Search
CPC ....... H04W 4/70; H04W 48/12; H04W 56/00; H04W 4/90
See application file for complete search history.

(56) References Cited

U.S. PATENT DOCUMENTS

| | | | |
|---|---|---|---|
| 2011/0103288 A1 | 5/2011 | Lee et al. | |
| 2012/0094699 A1* | 4/2012 | Tamura | H04W 48/12 455/458 |
| 2012/0220329 A1 | 8/2012 | Kitazoe et al. | |
| 2014/0211758 A1 | 7/2014 | Lee | |
| 2014/0307591 A1* | 10/2014 | Wang | H04W 72/1231 370/278 |
| 2015/0250017 A1* | 9/2015 | Ingale | H04B 7/2615 370/280 |
| 2016/0081036 A1 | 3/2016 | Luo et al. | |
| 2016/0309396 A1* | 10/2016 | Chai | H04W 16/28 |
| 2016/0329958 A1 | 11/2016 | Gou et al. | |
| 2017/0118665 A1* | 4/2017 | Park | H04W 24/08 |
| 2017/0280372 A1* | 9/2017 | Martin | H04W 76/11 |

FOREIGN PATENT DOCUMENTS

| | | |
|---|---|---|
| CN | 102413548 A | 4/2012 |
| CN | 103974348 A | 8/2014 |
| CN | 104105127 A | 10/2014 |
| CN | 104735680 A | 6/2015 |
| CN | 104754723 A | 7/2015 |
| WO | 2014116049 A1 | 7/2014 |
| WO | 2014187068 A1 | 11/2014 |
| WO | 2015021643 A1 | 2/2015 |
| WO | 2015042817 A1 | 4/2015 |
| WO | 2015069051 A1 | 5/2015 |

OTHER PUBLICATIONS

3GPP TS 36.331 V13.0.0 (Dec. 2015),3rd Generation Partnership Project;Technical Specification Group Radio Access Network;Evolved Universal Terrestrial Radio Access (E-UTRA);Radio Resource Control (RRC);Protocol specification (Release 13),total 507 pages.
International Search Report issued in International Application No. PCT/CN2016/071745 dated May 3, 2016, 19 pages.
XP050112767 R2-99414 TSGR2#4(99)414,Ericsson,"Structure of System Information",TSG-RAN Working Group 2 (Radio layer 2 and Radio layer 3),Berlin, Germany, May 25-28, 1999,total 5 pages.
Extended European Search Report issued in European Application No. 16885707.6 dated Oct. 19, 2018, 9 pages.
Office Action issued in Chinese Application No. 201910631212.2 dated Feb. 6, 2020, 14 pages. (with English translation).
ZTE, ZTE Microelectronics, Discussion on beamforming procedure considering high frequency channel characteristics. 3GPP TSG RAN WG1 Meeting #87, Reno, USA, Nov. 14-18, 2016, R1-1611420, 6 pages.

* cited by examiner

US 11,039,418 B2

METHOD FOR PROCESSING SYSTEM MESSAGE, NETWORK DEVICE, AND USER TERMINAL

CROSS-REFERENCE TO RELATED APPLICATIONS

This application is a continuation of International Application No. PCT/CN2016/071745, filed on Jan. 22, 2016, which is hereby incorporated by reference in its entirety.

TECHNICAL FIELD

The present disclosure relates to the field of communications technologies, and in particular, to a method for processing a system message, a network device, and a user terminal. Embodiments of the present invention relate to the method for processing a system message by using a cell cluster, and the network device and the user terminal thereof.

BACKGROUND

With rapid development of mobile broadband (MBB) and popularization of smartphones, the mobile Internet is rapidly and deeply changing and enriching people's lives. Wireless network statistics of Huawei's mLAB show that a compound annual growth rate of global mobile data traffic is as high as 67%, meanwhile, distribution of network traffic is extremely unbalanced, and capacity requirements in hot spots are explosively increased.

Based on the foregoing requirements, to provide relatively high system capacity for a hot spot, a micro cell is usually set up in the hot spot, and a service is provided for a mobile user in the hot spot by using the micro cell. Therefore, a mobile communications network is usually of a multi-layer cell structure (heterogeneous network, HetNet). With continuous evolution of a network, a structure of the network becomes more complex, and mutual coverage between networks becomes more common. In a possible implementation, a macro base station is used to create a macro cell to implement large continuous network coverage, then a large quantity of dense micro base stations are used in the hot spot to create micro cells for overlapping coverage, and the micro cells provide relatively high system capacity. In particular, as a common basic message, a system message usually needs to be broadcast in a cell. When a plurality of cells send system messages, resource waste may be caused, and in addition, overlapping parts of the cells may even cause a resource conflict. A user terminal needs to receive a system message of each cell, and a process of parsing these excessive system messages also causes a relatively long waiting time. Therefore, an existing system message processing mechanism cannot meet a requirement of a multi-layer cell deployment scenario.

SUMMARY

In this specification, a system message processing mechanism is provided, so as to implement system message processing in a multi-layer cell deployment scenario.

According to an aspect, an embodiment of this application provides a method for processing a system message. The method includes: determining, by a network device, a system message that carries at least one piece of information about a cell cluster, where the cell cluster includes a set of at least one cell, and the information about the cell cluster includes at least one piece or a combination of characteristic information of the cell cluster, public information of the cell cluster, access information of the cell cluster, or other information of the cell cluster; and sending, by the network device, the system message that carries the information about the cell cluster. Correspondingly, a user terminal receives, based on a processing manner corresponding to the network device, the system message that carries the at least one piece of information about the cell cluster, so as to select a cell. Because of introduction of the cell cluster, scheduling of system information becomes flexible and reliable.

In a possible design, the network device sends, in at least one of the following manners, the system message that carries the information about the cell cluster: broadcast, multicast, or dedicated signaling. In this way, the system message that carries the information about the cell cluster may be sent in various manners. The cell cluster may be a set of at least two cells. A cell usually has a network device corresponding to the cell, and there may be the following case: The network device is a first network device, a system message sent by the first network device includes system information of a second network device, and the second network device is different from the first network device. In this way, the system message of the first network device sends the system information of the second network device, and the information can be obtained from the information about the cell cluster in the system message. Optionally, a network node corresponding to a cell in the information about the cell cluster has a same coverage area as the network device, or the network node is adjacent to the network device. The network device may alternatively be a network node corresponding to one or more cells in the information about the cell cluster. In this way, although a quantity of layers of cells or a quantity of cells in a multi-layer cell structure is large, system information of different cells may be all sent by using one or more network devices, so that scheduling of the system information is more flexible and reliable.

In a possible design, the characteristic information of the cell cluster includes a distinct feature of a cell in the cell cluster. The characteristic information of the cell cluster includes at least one piece of the following information: carrier frequency information, bandwidth information, cell-supported service feature information, cell-supported function feature information, radio access type information, beamforming configuration information, random access information, location information, synchronization information, or an RNTI corresponding to a system information block (SIB) of a cell in the cell cluster, and a system message resource of a cell in the cell cluster. The public information of the cell cluster includes same information about cells in the cell cluster and includes at least one piece of the following information: a public land mobile network (PLMN) identifier (ID), a tracking area code (TAC), a cell global identifier (CGI), carrier frequency information, bandwidth information, or information about whether a cell is barred. The access information of the cell cluster includes access information of at least one cell in the cell cluster and includes at least one piece of the following information: a public land mobile network (PLMN) identifier (ID), a tracking area code (TAC), a cell global identifier (CGI), carrier frequency information, bandwidth information, random access information, operation mode information, cell logical channel configuration information, cell physical channel and signaling configuration information, cell signaling configuration information, timer information, a cyclic prefix (CP) length, or power control information. The characteristic information, public information, access information, and other information of the cell cluster are merely examples for description, and the information may be set in an overlapping manner. The information is set differently based on different system statuses. Through different settings of the information, the system information can be scheduled more flexibly. It may be understood that the information about the cell cluster may include identification information of the cell cluster.

In a possible design, a system information block may be sent in different manners, including but not limited to the following: One system information block SIB includes a plurality of pieces of information about cell clusters; one SIB includes one piece of cell cluster information of a cell cluster, and different SIBs include information about different cell clusters; a first SIB includes first information of one piece of information about a cell cluster, a second SIB includes second information of the information about the cell cluster, the first information and the second information each are one piece of characteristic information, public information, access information, or other information of the information about the cell cluster, and the first information is different from the second information; or a first SIB includes first information of a plurality of pieces of information about a cell cluster, a second SIB includes second information of the plurality of pieces of the information about the cell cluster, the first information and the second information each are one piece of characteristic information, public information, access information, or other information of the plurality of pieces of the information about the cell cluster, and the first information is different from the second information; and the SIB includes scheduling information of the SIB of the information about the cell cluster, where the scheduling information includes at least one piece of the following information: a scheduling period, time domain information of the SIB of the information about the cell cluster, or frequency domain information of the SIB of the information about the cell cluster. Through different settings, different scheduling forms can be provided, so as to meet requirements on system information in different scenarios.

In order to preferentially schedule important information and then schedule relatively unimportant information, different scheduling periods may be used for different pieces of information about the cell cluster, that is, the characteristic information of the cell cluster, the public information of the cell cluster, the access information of the cell cluster, and the other information of the cell cluster. For example, a scheduling period of the characteristic information of the information about the cell cluster is less than one of a scheduling period of the public information, a scheduling period of the access information, or a scheduling period of the other information of the information about the cell cluster; a scheduling period of the other information of the information about the cell cluster is greater than one of a scheduling period of the characteristic information, a scheduling period of the public information, a scheduling period of the access information, or the scheduling period of the other information of the information about the cell cluster; or a scheduling period of the public information of the information about the cell cluster is greater than one of a scheduling period of the characteristic information or a scheduling period of the access information of the information about the cell cluster.

Based on a system message processing manner that is based on the information about the cell cluster and provided in this embodiment of the present invention, a cell cluster required by the user terminal or a cell in the cell cluster can be determined. In this way, a fast and accurate communication means is established for transferring system messages between the network device and the user terminal.

According to another aspect, an embodiment of this application provides a method for processing a system message. The method includes: determining, by a network device, a cell cluster corresponding to system information that needs to be updated, where the cell cluster includes a set of at least one cell, and information about the cell cluster includes at least one piece or a combination of characteristic information of the cell cluster, public information of the cell cluster, access information of the cell cluster, or other information of the cell cluster; and sending indication information, where the indication information indicates that a system message of the cell cluster has changed or whether a system message of the cell cluster has changed. Correspondingly, a user terminal obtains the indication information based on a processing manner corresponding to the network device, where the indication information indicates that the system message of the cell cluster has changed or whether the system message of the cell cluster has changed; and determines whether currently used information about the cell cluster needs to be updated. Because of introduction of the cell cluster, updating of system information becomes flexible and reliable.

In a possible design, the indication information may use different forms, or may indicate that a system message of a cell in the cell cluster has changed, or may indicate whether a system message of a cell in the cell cluster has changed. This can be predetermined by two communication parties, so that updating of the system information is more flexible.

In a possible design, the indication information may be carried in a system message or a system information update message. This is determined based on an agreement of two communication parties, that is, the indication information is carried in the system message or not carried in the system message.

In a possible design, the indication information may be an index number, of a cell cluster, configured by the network device, and the network device adds the indication information to a physical control channel that is to be sent and used to schedule the system information update message; or the indication information is a radio network temporary identifier (RNTI), corresponding to a cell cluster, configured by the network device, and when sending a physical control channel that is used to schedule the system information update message, the network device uses the indication information to perform a cyclic redundancy check (CRC) operation; or the indication information is a channel configuration parameter, corresponding to a cell cluster, configured by the network device, and the network device uses the channel configuration parameter in the indication information to configure a physical control/data channel of the system information update message; or the indication information is a resource location in time domain and/or a resource location in frequency domain at which a system update message, corresponding to a cell cluster, configured by the network device is sent, and the network device uses the resource location indicated in the indication information, to send the system information update message.

According to another aspect, an embodiment of this application provides a method for processing a system message. The method for processing a system message includes: obtaining, by a user terminal, indication information, where the indication information indicates that a system message of a cell cluster has changed or whether a system message of a cell cluster has changed, the cell cluster includes a set of at least one cell, and information about the cell cluster includes at least one piece or a combination of characteristic information of the cell cluster, public information of the cell cluster, access information of the cell cluster, or another system message of the cell cluster; and determining, by the user terminal, whether currently used information about the cell cluster needs to be updated. The user terminal may learn, by using the information about the cell cluster, whether the corresponding system information needs to be updated.

The indication information may be carried in a system information update message or carried in a system message. Further, the user terminal may update, based on the indication information, the currently used information about the cell cluster or a system message of a cell in a currently used cell cluster. In this way, the user terminal may update the corresponding system information based on the information about the cell cluster, and obtain useful information in time and effectively. If the indication information is carried in the system message, the user terminal needs to monitor a system message corresponding to the currently used information about the cell cluster. Through different settings of the foregoing manner, the system information can be scheduled more flexibly.

According to still another aspect, an embodiment of the present invention provides a plurality of network devices, and the network device has a function of implementing behavior of the network device in the foregoing method designs. The function may be implemented by hardware, or may be implemented by executing corresponding software by hardware. The hardware or software includes one or more modules that correspond to the foregoing function.

In a possible design, a structure of the network device includes a processor and a transmitter, and the processor is configured to allow the network device to perform a corresponding function in the foregoing method. The transmitter is configured to support communication between the network device and a user terminal, and send information or an instruction related to the foregoing method to the user terminal. The network device may further include a memory. The memory is configured to be coupled to the processor, and the memory stores a program instruction and data that are necessary for a base station.

According to yet another aspect, an embodiment of the present invention provides a plurality of user terminals, and the user terminal has a function of implementing behavior of the user terminal in the foregoing method design. The function may be implemented by hardware, or may be implemented by executing corresponding software by hardware. The hardware or software includes one or more modules that correspond to the foregoing function. The modules may be software and/or hardware.

According to still yet another aspect, an embodiment of the present invention provides a plurality of communications systems, and the system includes the network device and the user terminal according to the foregoing aspect.

According to a further aspect, an embodiment of the present invention provides a plurality of computer storage media, and the computer storage medium is configured to store a computer software instruction used by the foregoing network device, where the computer software instruction includes a program used to execute the designs in the foregoing aspects.

According to a still further aspect, an embodiment of the present invention provides a plurality of computer storage media, and the computer storage medium is configured to store a computer software instruction used by the foregoing user terminal, where the computer software instruction includes a program used to execute the designs in the foregoing aspects.

Based on a system message processing manner that is based on the information about the cell cluster and provided in some embodiments of the present disclosure, system information required by the user terminal can be updated. In this way, a fast and accurate communication means is established for transferring system messages between the network device and the user terminal.

DESCRIPTION OF EMBODIMENTS

The following further describes in detail the technical solutions of the present invention with reference to the accompanying drawings and embodiments.

To help understand the embodiments of the present invention, the following provides a further description by using specific embodiments with reference to the accompanying drawings. The embodiments are not intended to limit the embodiments of the present invention.

Technologies described in the present invention may be applied to a Long Term Evolution (LTE for short) system, or another wireless communications system using various radio access technologies, for example, a system using an access technology such as Code Division Multiple Access, Frequency Division Multiple Access, Time Division Multiple Access, orthogonal frequency division multiple access, or single carrier frequency division multiple access. In addition, the technologies may be applicable to a subsequent evolved system of an LTE system, for example, a $5^{th}$ Generation 5G system. For clarity, only the LTE system is used as an example herein for description.

Figure 1:
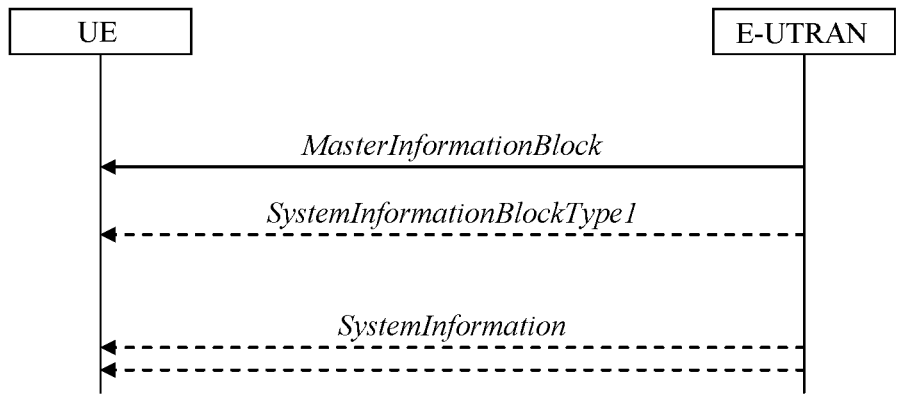
FIG. 1 is a schematic diagram of a system information broadcast solution in a communications system.

As shown in FIG. 1, in an LTE network, LTE system information broadcast is an important function in a communications system, and provides main information about an access network system, so that UE establishes a wireless connection. System information in the system information broadcast is a vinculum for connecting the UE to a network. System information is transferred between the UE and an E-UTRAN, to complete various services and physical processes of wireless communications.

In the LTE system information broadcast, information that is identical for configurations of all UEs in a cell is delivered. This saves a radio resource, so that the UE obtains sufficient access information and public configuration parameters for cell selection/reselection. The UE may be further notified of emergency information, for example, information about an earthquake and tsunami warning system (ETWS). Usually, content of the LTE system information broadcast is classified into a plurality of system information blocks (SIB). However, one of the blocks is given a different name: a master information block (MIB). Therefore, the system information is classified into a MIB and a plurality of system information blocks.

With network development, in a dense cell deployment scenario, an existing system message processing mechanism cannot meet a requirement.

Embodiments of the present invention provide a new implementation mechanism, which can process a system message based on a characteristic of dense cells, thereby avoiding disadvantages in the prior art.

In a possible manner, a concept of a cell cluster is introduced. One cell cluster includes a set of at least one cell. A plurality of cells are classified into one cell cluster, and a system message can be saved.

1. The following describes specifications of a cell cluster.

Figure 2:
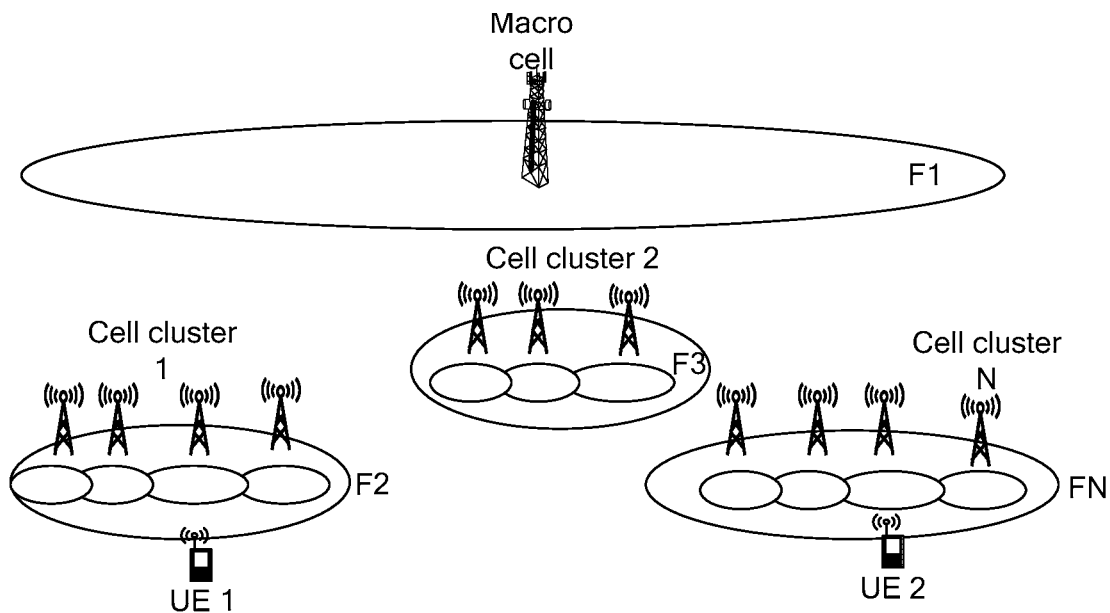
FIG. 2 is a schematic diagram of a communications system.

To describe an idea of this specification, FIG. 2 is used as an example, to describe a relatively simple network structure. F1 is a relatively large coverage area, for example, a macro cell. F2, F3, . . . , FN are different cell clusters. Each cell cluster includes at least one cell. For example, a cell cluster 1 has four cells and may cover an area of F2, and a cell cluster 2 has three cells and may cover an area of F3. It should be noted that areas covered by different cell clusters may overlap, be interlapped, or have same coverage. The same coverage means that two areas have a same coverage area. A plurality of cells included in a same cell cluster do not necessarily need to be adjacent to each other. Different cells in different cell clusters can be adjacent to each other. In conclusion, the cell cluster may be a set of cells having a same attribute, but is not limited to a geographical location.

There may be a plurality of cell cluster classification methods. Cell clusters can be classified based on at least one of the following characteristics:

service type information provided by a cell in a cell cluster, function type information supported by a cell in a cell cluster, location information of a cell in a cell cluster (for example, cells that are geographically adjacent to each other), radio access technologyinformation of a cell in a cell cluster, beamforming configuration information of a cell in a cell cluster, radio access type information of a cell in a cell cluster, OFDM modulation scheme information of a cell in a cell cluster, or OFDM subcarrier group information of a cell in a cell cluster.

The foregoing characteristics are merely examples and are not limited thereto. A person skilled in the art may understand that cells having a same attribute may be classified into one cell cluster. For example, cells of a cell cluster 1 each can provide a VoLTE (Voice over LTE) service; cells of a cell cluster 2 each can provide machine type communication (MTC), a proximity-based service (ProSe), that is, cellular network LTE-based D2D communication (device-to-device communication), and a vehicle-to-vehicle (V2V) communications technology service; cells of a cell cluster 3 each can provide a Multimedia Broadcast Multicast Service (MBMS) and a Single Cell Point To Multipoint (SC-PTM) service. Therefore, if a cell cluster classification method is based on the service type information provided by a cell in a cell cluster, cells providing a same type of service may be classified into one cell cluster. For example, the service type may be at least one of the following: MTC, MBB, Crucial MTC, a home eNB, an MBMS, an ETWS/a CMAS, or a ProSe.

If the cell cluster classification method is based on the OFDM modulation scheme information used by a cell in a cell cluster, cells providing a same OFDM modulation scheme may be classified into one cell cluster. For example, cells in a cell cluster 1 each use a fast Fourier transformation (FFT), and a quantity (size) of points for the fast Fourier transformation is 256; a quantity (size) of points for a fast Fourier transformation used by each cell in a cell cluster 2 is 1024.

If the cell cluster classification method is based on the radio access type information used by a cell in a cell cluster, cells providing a same radio access type may be classified into one cell cluster. For example, cells in a cell cluster 1 each use at least one same parameter of the following parameters: a quantity of OFDM symbols per subframe, subframe duration, a CP length, a CP overhead, HARQ timing, or a CP, cyclic prefix.

Alternatively, several cells each use an orthogonal frequency division multiplexing (OFDM) technology.

Alternatively, several cells each use a same radio access technology: a Global System for Mobile Communications (GSM), a Universal Mobile Telecommunications System (UMTS), Long Term Evolution (LTE), or a next generation 5 G network.

Further, when cell clusters are classified, features for classification may be in a plurality of dimensions, and cells having a plurality of same attributes may be classified into one cell cluster. For example, a service type may also be bound to another characteristic. For example, cells providing different service types (such as MTC, MBB, Crucial MTC, a home eNB, an MBMS, an ETWS/a CMAS, and a ProSe) may have different radio access types and different OFDM manners, may be carried on different OFDM subcarrier groups (OFDM subcarrier grouping), or may have different beamforming.

Information about a cell cluster is used to describe attributes of the cell cluster. These attributes are from system information of a cell corresponding to the cell cluster. The information about the cell cluster may include at least one piece or a combination of characteristic information of the cell cluster, public information of the cell cluster, access information of the cell cluster, or other information of the cell cluster. When the cell cluster includes only one cell, an attribute of the cell may be used as the cell cluster information of the cell cluster.

The characteristic information of the cell cluster includes a distinct feature of a cell in the cell cluster, for example, may include at least one of the following attributes:
  carrier frequency information CarrierFreq,
  bandwidth information Bandwidth,
  cell-supported service and/or function feature information (which may be in a bitmap format),
  radio access type information,
  beamforming configuration information,
  random access information (if random access resources of the cell cluster are the same),
  location information,
  synchronization information, or
  a dedicated RNTI corresponding to a SIB of a cell in the cell cluster, and a dedicated system message resource of a cell in the cell cluster (classification may be performed based on dimensions such as a frequency, a time, and space).

The cell-supported service and/or function feature information is explained herein. The information may be defined in an explicit manner or defined in a bitmap format.
  For example, an explicit definition is as follows:
  A service type is:
  a VoLTE, MTC, a ProSe, V2V, an MBMS, SC-PTM, a VoIP, telepresence, . . .
  For example, the information is defined in a bitmap format: such as a bit string (0, . . . , 20, . . . ).
  If each bit position is 1, it indicates that a corresponding function is supported; or if each bit position is 0, it indicates that a corresponding function is not supported.
  If a VoLTE (on a first bit position), MTC (on a second bit position), a ProSe (on a third bit position), V2V (on a fourth bit position), an MBMS (on a fifth bit position), SC-PTM (on a sixth bit position), a VoIP (on a seventh bit position), and telepresence (on an eighth bit position) are represented, for example, by 01100000, it indicates that MTC and ProSe services are supported.

The random access information (if the random access resources of the cell cluster are the same) is explained herein, and is, for example, a random access preamble (RA preamble) sequence resource pool, or a PRACH (packet random access channel, packet random access channel) time-frequency resource pool.

The synchronization information is explained herein. For example, the information is used to indicate whether cells in the cell cluster are synchronous or asynchronous. If the cells in the cell cluster are synchronous, an absolute start time of the cell cluster may be provided.

Usually, a cell cluster includes a plurality of cells. Each cell has many attributes, some of the attributes are the same, and some of the attributes are different. The public information of the cell cluster is used to describe a same attribute of the cells in the cell cluster. It may be understood that the public information of the cell cluster does not exclude the characteristic information of the cell cluster. That is, the public information may include the characteristic information, or may not include the characteristic information. The public information of the cell cluster may include at least one piece of the following information:
  a public land mobile network (PLMN) identifier (ID),
  a tracking area code (TAC),
  a cell global identifier (CGI),
  carrier frequency information (carrierfreq),
  bandwidth information, or
  information about whether a cell is barred (cell barred).

The access information of the cell cluster is used to describe access information of at least one cell in the cell cluster. A user terminal may establish a connection to a cell or camp on the cell based on the access information. A person skilled in the art may understand that all conventional access information may be used as the access information of the cell cluster, and details are not described herein. The access information of the cell cluster may include at least one piece of the following information:
  a public land mobile network (PLMN) identifier (ID),
  a tracking area code (TAC),
  a cell global identifier (CGI),
  carrier frequency information,
  bandwidth information,
  random access information,
  operation mode information (TDD or FDD),
  cell logical channel configuration information,
  cell physical channel and signaling configuration information,
  cell signaling configuration information,
  timer information,
  a cyclic prefix (CP) length, or
  power control information.

The access information of the cell may include at least a part of information carried in a MIB, a SIB 1, and/or a SIB 2 specified in 3GPP 36.331 (3GPP TS 36.331 V13.0.0 (2015-12), where a downloading address is http://www.3gpp.org/dynareport/36331.htm), or a combination of at least a part of information carried in a MIB, a SIB 1, and a SIB 2. Content of this protocol is included in this application, and details are not described again.

It may be understood that the cell cluster may have many attributes, and other information of the cell cluster may be further set. The other information of the cell cluster may include other information of the cell cluster other than the characteristic information, the public information, and the access information of the cell cluster. The information describes the attributes of the cell cluster and/or an attribute of a cell in the cell cluster.

The information about the cell cluster is carried in a system message, and the system message that carries the information about the cell cluster may be sent in at least one of the following manners: broadcast, multicast, or dedicated signaling.

The characteristic information, the public information, the access information, and the other information of the cell cluster may appear at the same time, or one piece or a combination of the characteristic information, the public information, the access information, or the other information of the cell cluster may appear. A same attribute may appear in one or more pieces of the foregoing information. This is not limited in the present invention.

The cell cluster may further have identification information, for example, information similar to an index number. It may be understood that in the system message, the identification information may appear in an explicit manner, that is, there is an identification field indicating that the information about the cell cluster belongs to a cell cluster n; or appear in an implicit manner, that is, there is no identifier particularly indicating that the information about the cell cluster belongs to a cell cluster n (n is a positive integer). Although the implicit manner is used, two communication parties may, in advance, agree on that/notify each other that cell cluster information meeting a specific condition represents the cell cluster n. For example, an $n^{th}$ information unit in the system message is cell cluster information of the cell cluster n.

2. The following describes several possible definition manners of information about a cell cluster.

Manner 1: One SIB includes a plurality of pieces of information about cell clusters.

Table 1 shows that an $m^{th}$ SIB includes cell cluster information of a cell cluster 1 to a cell cluster n. Optionally, each piece of information about a cell cluster includes an index number of the cell cluster. Optionally, each piece of information about the cell cluster includes at least one piece of characteristic information, public information, access information, or other information of the information about the cell cluster. Usually, one piece of information about a cell cluster includes at least one piece of the foregoing information. In each of the following tables, a SIB m represents only the $m^{th}$ SIB, but does not indicate that the SIB includes a "SIB m" text.

TABLE 1

SIB M
>>Index number of the cell cluster 1 (optional)
>>Characteristic information of the cell cluster 1 (optional)
>>Public information of the cell cluster 1 (optional)
>>Access information of the cell cluster 1 (optional)
>>Other information of the cell cluster 1 (optional)
. . .
>>Index number of the cell cluster n (optional)
>>Characteristic information of the cell cluster n (optional)
>>Public information of the cell cluster n (optional)
>>Access information of the cell cluster n (optional)
>>Other information of the cell cluster n (optional)

It should be noted that table cells herein are merely an example for describing a relationship between each piece of information about a cell cluster and the SIB, and are not intended to limit a length of a field occupied by each piece of information or to be used as another improper limitation relationship. In addition, even though the foregoing characteristic information, public information, access information, and other information are defined in one SIB, the SIB may be segmented. A size of a transport block or an information unit type may be used as a unit for the segmenting. The information unit type is characteristic information, public information, access information, or other information. In the present invention, values of scheduling periods of different segments of even one SIB may be different. For example, a first segment in the SIB m is characteristic information, a second segment is public information, a third segment is access information, and a fourth segment is other information, where a value of a scheduling period of the first segment is the smallest, a value of a scheduling period of the third segment is the second smallest, and values of scheduling periods of the second segment and the fourth segment are greater than those of the first segment and the third segment, and are the same.

Manner 2: One SIB includes one piece of information about a cell cluster, and different SIBs include information about different cell clusters.

Table 2 shows that a SIB m includes cell cluster information of a cell cluster 1. A SIB z includes cell cluster information of a cell cluster n. Optionally, each piece of information about a cell cluster includes an index number of the cell cluster. Optionally, the information about the cell cluster includes characteristic information, public information, access information, and other information of the information about the cell cluster. Usually, one piece of information about a cell cluster includes at least one piece of the foregoing information.

TABLE 2

SIB M
>Index number of the cell cluster 1 (optional)
>Characteristic information of the cell cluster 1 (optional)
>Public information of the cell cluster 1 (optional)
>Access information of the cell cluster 1 (optional)
>Other information of the cell cluster 1 (optional)
. . .
SIB z
>Index number of the cell cluster n (optional)
>Characteristic information of the cell cluster n (optional)
>Public information of the cell cluster n (optional)
>Access information of the cell cluster n (optional)
>Other information of the cell cluster n (optional)

Manner 3: One SIB includes at least one piece of characteristic information, public information, access information, or other information of one piece of information about a cell cluster, and other information of the characteristic information, the public information, the access information, and the other information of the same cell cluster is located in another SIB. One piece of information about a cell cluster occupies a plurality of SIBs, and different cell clusters are located in different SIB groups.

Table 3 shows that a SIB m_1 includes characteristic information of a cell cluster 1, a SIB n_1 includes public information of the cell cluster 1, a SIB x_1 includes access information of the cell cluster 1, and a SIB y_1 includes other message of the cell cluster 1. It should be noted that the characteristic information, the public information, the access information, and the other information do not necessarily appear at the same time. Only one piece or a combination of the characteristic information, the public information, the access information, or the other information may appear.

TABLE 3

SIB m_1:
>>Index number of the cell cluster 1 (optional)
>>Characteristic information of the cell cluster 1
. . .
SIB n_1:
>>Index number of the cell cluster 1 (optional)
>>Public information of the cell cluster 1
. . .
SIB x_1:
>>Index number of the cell cluster 1 (optional)
>>Access information of the cell cluster 1
. . .
SIB y_1:
>>Index number of the cell cluster 1 (optional)
>>Other information of the cell cluster 1
. . .
. . .
SIB m_n:
>>Index number of a cell cluster n (optional)
>>Characteristic information of the cell cluster n
. . .
SIB n_n:
>>Index number of the cell cluster n (optional)
>>Public information of the cell cluster n
. . .
SIB x_n:
>>Index number of the cell cluster n (optional)
>>Access information of the cell cluster n
. . .

TABLE 3-continued

SIB y_n:
>>Index number of the cell cluster n (optional)
>>Other information of the cell cluster n
. . .

Manner 4: A first SIB includes first information of a plurality of pieces of information about a cell cluster, a second SIB includes second information of the plurality of pieces of the information about the cell cluster, the first information and the second information each are one piece of characteristic information, public information, access information, or other information of the plurality of pieces of the information about the cell cluster, and the first information is different from the second information.

Table 4 shows that a SIB m includes characteristic information of a cell cluster 1 to a cell cluster n. A SIB n includes public information of the cell cluster 1 to the cell cluster n. A SIB x includes access information of the cell cluster 1 to the cell cluster n. A SIB y includes other information of the cell cluster 1 to the cell cluster n. Optionally, each piece of information about a cell cluster includes an index number of the cell cluster. Usually, it should be noted that the characteristic information, the public information, the access information, and the other information do not necessarily appear at the same time. Only one piece or a combination of the characteristic information, the public information, the access information, or the other information may appear.

TABLE 4

SIB m:
>>Index number of the cell cluster 1 (optional)
>>Characteristic information of the cell cluster 1
. . .
>>Index number of the cell cluster n (optional)
>>Characteristic information of the cell cluster n
. . .
SIB n:
>>Index number of the cell cluster 1 (optional)
>>Public information of the cell cluster 1
. . .
>>Index number of the cell cluster n (optional)
>>Public information of the cell cluster n
. . .
SIB x:
>>Index number of the cell cluster 1 (optional)
>>Access information of the cell cluster 1
. . .
>>Index number of the cell cluster n (optional)
>>Access information of the cell cluster n
. . .
SIB y:
>>Index number of the cell cluster 1 (optional)
>>Other information of the cell cluster 1
. . .
>>Index number of the cell cluster n (optional)
>>Other information of the cell cluster n
. . .

Because of different importance of or different requirements for information about a cell cluster, different scheduling periods may be used for different SIBs. In the foregoing Manner 3 and Manner 4, corresponding scheduling periods may be used for different SIBs. For example, it may be set that a scheduling period period_m of characteristic information of a cell cluster is relatively small, and a scheduling period period_n of public information of the cell cluster is greater than period_m; likewise, it may be set that a scheduling period period_x of access information of the cell cluster is greater than period_m. In this way, the characteristic information may be updated more frequently, which helps two communication parties quickly establish/maintain communication.

The SIB in the foregoing tables 1 to 4 represents a system information block, and a single transmission of SIB content is usually completed within a conventional transmission time interval, for example, a TTI (1 ms). The embodiments of the present invention are also applicable to a scenario in which the SIB is replaced with another time unit or another information unit.

Manner 5 is a further variant of Manner 4. The information about a cell cluster is defined based on Manner 4. In addition, by using other signaling such as each SIB or a particular SIB, the user terminal is notified of a scheduling period of a SIB of information about a cell cluster, for example, a scheduling period of a SIB m. When receiving the scheduling period and a system message similar to that in Manner 4, the user terminal can clearly know a corresponding SIB, so that a system message of the SIB can be selected for monitoring. The SIB of the information about the cell cluster emphasized herein is one piece of characteristic information, public information, access information, or other information of the cell cluster.

In Manner 5, the SIB needs to include scheduling information of the SIB of the information about the cell cluster, where the scheduling information includes at least one piece of the following information: a scheduling period, time domain information (information such as a radio frame, a subframe, a slot, and/or a time symbol) of the SIB of the information about the cell cluster, or frequency domain information (information such as transmission bandwidth, a PRB serial number, and/or a PRB location) of the SIB of the information about the cell cluster.

For example, in Manner 5, the characteristic information of the cell cluster 1 may include: supported service and/or function feature information (supporting a CA carrier aggregation (CA), dual connectivity (DC), and a multiple input multiple output (MIMO) function, and supporting a ProSe service), carrier frequency information CarrierFreq, bandwidth information Bandwidth, a radio access type: a type 2, beamforming configuration information, location information, and synchronization information (if the cell cluster is deployed synchronously). The characteristic information of the cell cluster n may include: supported service or function feature information (supporting coordinated multi-point transmission (CoMP) and a DC function, and supporting MTC, an MBMS, and a V2V service), carrier frequency information CarrierFreq, bandwidth information Bandwidth, a radio access type: a type 4, beamforming configuration information, a resource location (a period, an offset, and an OFDM subcarrier group), random access information (if random access resources of the cell cluster are the same), location information, and a corresponding RNTI.

The two communication parties may comply with the foregoing specifications of the cell cluster and definition Manner 1 to Manner 5 of the information about a cell cluster. Usually, the two communication parties are a network device and a user terminal. The network device is a network device that communicates with a user. For example, the network device may be a base station, including a macro base station, a micro cell base station, a home base station, or the like, or may be a base station that implements a relay function, or a similar device. The user terminal is a device that provides voice and/or data connectivity for the user, and includes a wireless terminal or a wired terminal. The wireless terminal may be a handheld device having a wireless connection function, or another processing device connected to a wireless modem. For example, the wireless terminal may be a mobile phone (or referred to as a "cellular" phone) or a computer having a mobile terminal. For another example, the wireless terminal may alternatively be a portable, pocket-sized, handheld, computer-embedded, or in-vehicle mobile apparatus. For another example, the wireless terminal may be a part of a mobile station or user equipment (UE).

Embodiment 1

Figure 3:
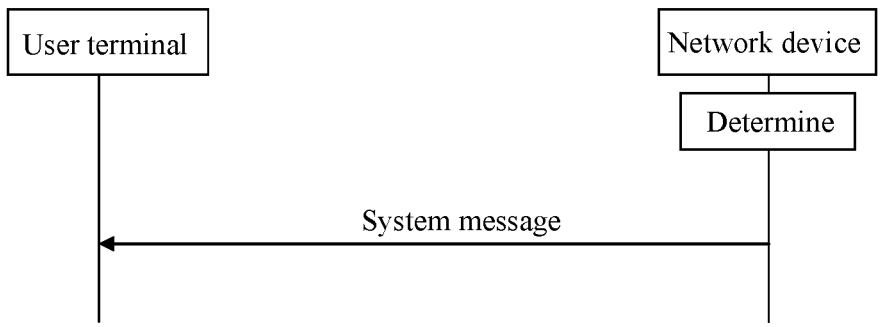
FIG. 3 is a schematic diagram of communication according to an embodiment of the present invention.

Referring to FIG. 3, a network device sends, based on one of Manner 1 to Manner 5, a system message that carries at least one piece of information about a cell cluster. Usually, the network device may send a system message in a broadcast manner, or a multicast manner, or a dedicated signaling manner, but the present invention is not limited thereto.

In the present invention, either of a multi-cell broadcast transmission mode or a multicast manner can be supported. That is, a multimedia broadcast multicast service single frequency network (MBSFN) is used to send a same system message that carries the information about the cell cluster. A base station device corresponding to at least one cell cluster simultaneously sends the same system message that carries the information about the cell cluster, and a user is allowed to simultaneously receive signals sent by a plurality of cells and perform combination processing, so as to improve transmission performance. In this case, to avoid intersymbol interference (ISI), delays of the signals sent by the plurality of cells are required to not exceed a length of a CP.

The present invention can support sending of a system message in a dedicated signaling manner. The network device or a base station device corresponding to a cell cluster sends, based on a requirement of a specific user, a system message that carries the information about the cell cluster and that is related to the user, and sends the system message to the user by using dedicated RRC signaling, for example, an RRC reconfiguration message or an RRC release message. For example, the system message that carries the information about the cell cluster is sent by using the RRC release message. A person skilled in the art may understand a method for setting a field in the foregoing dedicated signaling, and details are not described herein again.

Correspondingly, a user terminal receives, based on a processing manner corresponding to the network device, the system message that carries the at least one piece of information about the cell cluster, so as to obtain required information from the system message for further processing. Such processing may be selecting a cell.

Because a concept of a cell cluster is used, that is, information about the cell cluster is carried in a system message, the network device can send important information by using the information about the cell cluster, and the user terminal can obtain the required information. Therefore, the network device and the user terminal can cope with a challenge brought by a multi-layer cell structure.

Embodiment 2

Figure 4:
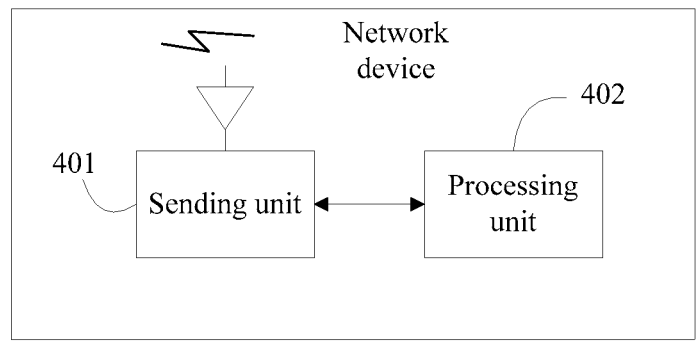
FIG. 4 is a schematic diagram of a network device according to an embodiment of the present invention.

This embodiment describes a network device.
As shown in FIG. 4, a network device includes:
a processing unit 401, configured to determine a system message that carries at least one piece of information about a cell cluster, where the cell cluster includes a set of at least one cell, and the information about the cell cluster includes at least one piece or a combination of characteristic information of the cell cluster, public information of the cell cluster, access information of the cell cluster, or other system message information of the cell cluster; and a sending unit 402, configured to send the system message that carries the information about the cell cluster.

The cell cluster may alternatively include a set of at least two cells, so as to meet a requirement of a multi-cell scenario.

Further, the sending unit is configured to send, in at least one of the following manners, the system message that carries the information about the cell cluster: broadcast, multicast, or dedicated signaling.

The processing unit of the network device in this embodiment may use the foregoing specifications of the cell cluster and definition manners of the information about a cell cluster, and details are not described herein again. The sending unit of the network device may comply with the foregoing specifications of the cell cluster and definition manners of the information about a cell cluster to send the system message. The network device in this embodiment may perform a method in Embodiment 4.

The network device in this embodiment has the following advantages: The network device may schedule a system message that has information about a cell cluster, as required, for sending, and scheduling flexibility is improved, so that cell clusters and radio resources corresponding to the cell clusters may be classified based on a service.

Figure 5:
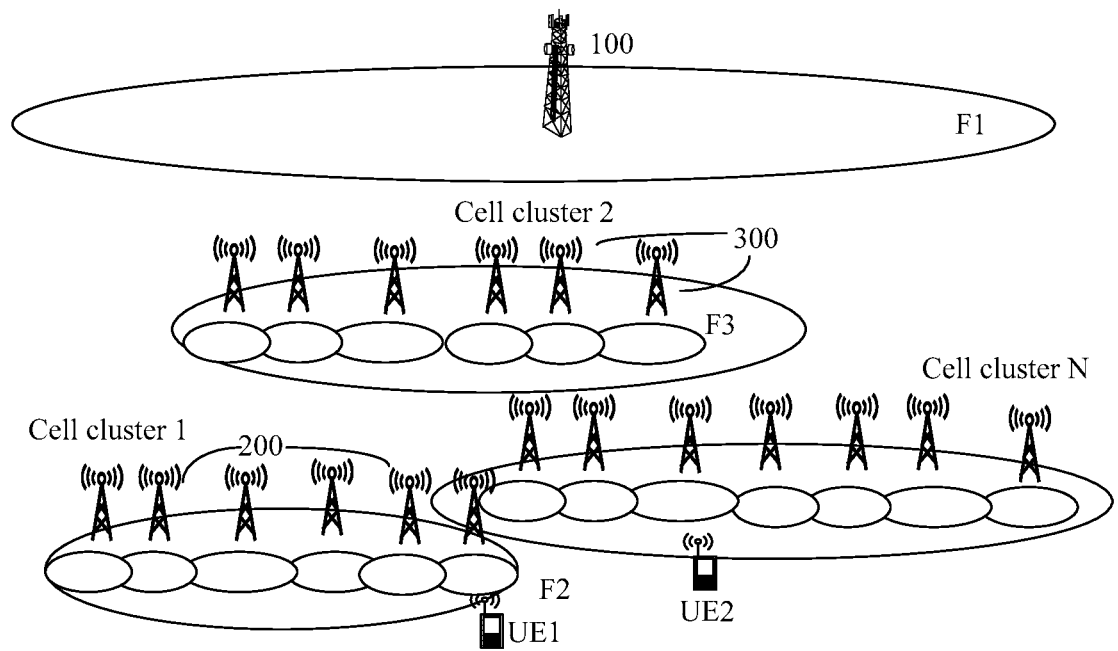
FIG. 5 is a schematic diagram of a communications system according to an embodiment of the present invention.

In an example, FIG. 5 shows a network device and a network structure to which the network device belongs. The network device 100 sends, usually in a broadcast manner, the foregoing system message to an F1 area covered by the network device 100. Several base station devices 200 are base stations of a cell cluster 1, and several base station devices 300 are base stations of a cell cluster 2. One base station may correspond to a plurality of cells, and herein, the base station/cell 200 represents a corresponding cell in the cell cluster, and is not limited to the base station. The network device 100 may be a network node that has same coverage as or is adjacent to the base station device 200/300. UE 1 is located in a cell that is covered by a base station device 200 in the cell cluster 1. The UE 1 may also receive the system message sent by network device 100. It may be understood that, provided that the F1 area and an F2 area overlap, the UE 1 can receive the system message sent by the network device 100. It should be noted that the system message sent by the network device 100 carries the information about the cell cluster. The carried information about the cell cluster herein includes cell cluster information of the cell cluster 1, that is, at least one piece or a combination of the characteristic information of the cell cluster, the public information of the cell cluster, the access information of the cell cluster, or the other system message of the cell cluster. Actually, the UE 1 receives related system information of the base station/cell 200 by using a system message 500 of the network device 100. It may be learned that the system information of the base station/cell 200 is sent by using the system message 500 in a form of cell cluster information. That is, the network device 100 sends system information of at least one second network device 200, that is, the network device 100 sends an attribute of the at least one second network device by using the system message of the network device 100.

It may be learned that one of advantages of the present invention is that the information about the cell cluster is simplified, so that a size of the system message 500 is reduced, and unified management can be performed on a plurality of cell clusters at a level of the network device 100.

Further, if the system message 500 further includes cell cluster information of the cell cluster 2, the UE 1 can learn system information of the base station/cell 300. If the UE 1 is located in the F2 area corresponding to the cell cluster 1 and is located in an F3 area corresponding to the cell cluster 2, the UE 1 can faster know which one of the two cell clusters is more suitable for a service requirement of the UE 1, so as to respond quickly.

As described above, the information about the cell cluster may include the access information of the cell cluster. The access information describes access information of at least one cell in the cell cluster. It may be understood that, when the access information includes sufficient access information of a cell, a user terminal can establish/maintain communication with the corresponding cell or camp on the corresponding cell only by using the access information of the cell cluster. When the access information includes only a part of access information of a cell, the user terminal cannot establish/maintain communication with the corresponding cell or camp on the corresponding cell only by using the access information of the cell cluster, and the user terminal may take further measures. These measures include but are not limited to: The user terminal triggers an inquiry mechanism, and obtains, by using specific signaling, other access information from a network device (for example, the network device 100 or the base station/cell 200) corresponding to a cell; or the user terminal monitors another system message other than the system message 500 to obtain other access information. Access information or other information of a cell in the cell cluster may not be sent all by using the information about the cell cluster, but may alternatively be sent by a network node corresponding to the cell, for example, a base station. Therefore, a part of access information that is of a cell and that is in the access information of the cell cluster and/or a system message that is of a cell and that is in the system message of the cell cluster may be further sent by the network node corresponding to the cell.

Optionally, the base station device 200 or 300 may alternatively send information about the cell cluster 1 corresponding to the network device 200 and the cell cluster 2 corresponding to the network device 300.

Although FIG. 5 shows a two-layer cell structure, the present invention is not limited thereto. A person skilled in the art may understand that a same technical solution may also be applied to a structure of three or more layers of cells or to a case in which cells directly overlap.

Optionally, in a sending process, it is possible that because a SIB includes a relatively large amount of information about a cell cluster, a length of the SIB is greater than a maximum size of a block sent at a conventional transmission time interval, for example, a TTI, and the SIB may be segmented and sent in a send window. One piece of SI (system information) may include a plurality of SIBs having a same period, and a specific mapping relationship configuration is included in scheduling information of a SIB 1. That is, a SIB may have a broadcast window every other scheduling period based on corresponding SI, and SIB content in the SI is repeatedly broadcast in the broadcast window. For example, a start location of a send window for each piece of SI is determined by the following formula:

A specific algorithm is:
x=(n−1)×Window Length, where n is n of SI-n and is an index, and n is greater than or equal to 1.

After x is determined, UE needs to determine start locations of a radio frame and subframe of SI-n. A specific algorithm is as follows:
Subframe location: a=x mod 10
Radio frame location: SFN mod T=FLOOR(x/10)

Window Length is an absolute value whose value range is [1, 2, 5, 10, 15, 20, 40] and whose unit is a subframe, and is indicated in the SIB 1.

The present invention provides a technology, that is, if a length of information content carried in the SIB is greater than a maximum transport block size used at a conventional transmission time interval (for example, a TTI), the information content carried in the SIB is segmented into a segment_1 and a segment_2, and then the segment_1 and the segment_2 are repeatedly sent in a send window in the following sequence: the segment_1, the segment_2, the segment_1, the segment_2, . . . , where it may indicate, in each segment by using indication information, that the content of this SIB has not ended or has ended, and the UE needs to continue reading. The indication information may be added to RRC signaling, or may be indicated by using a MAC SDU/PDU.

Embodiment 3

Corresponding to the network device in Embodiment 2, this embodiment further provides a user terminal.

Figure 6:
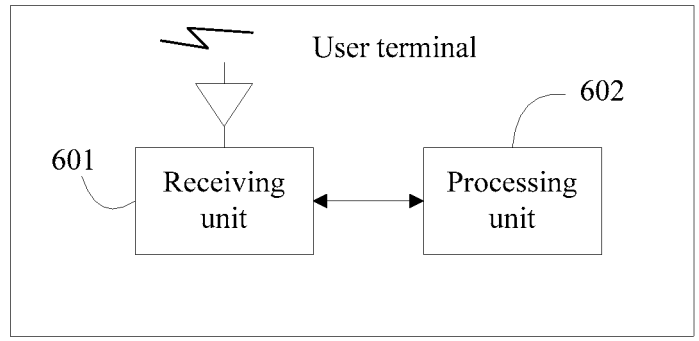
FIG. 6 is a schematic diagram of a user terminal according to an embodiment of the present invention.

As shown in FIG. 6, a user terminal includes:

a receiving unit 601, configured to receive a system message that carries at least one piece of information about a cell cluster, where the cell cluster includes a set including at least one cell, and the information about the cell cluster includes at least one piece or a combination of characteristic information of the cell cluster, public information of the cell cluster, access information of the cell cluster, or another system message of the cell cluster; and a processing unit 602, configured to select at least one cell based on the system message, where the selected cell is a cell indicated in the information about the cell cluster.

The user terminal in this embodiment may comply with and use the foregoing specifications of the cell cluster and definition manners of the information about a cell cluster, and details are not described herein again. The user terminal in this embodiment may performa method in Embodiment 5. It may be understood that this embodiment corresponds to the network device in Embodiment 2, and therefore same or similar parts are not described herein again.

The user terminal in this embodiment has the following advantages: The user terminal may schedule a system message that has information about a cell cluster, and scheduling flexibility is improved, so that cell clusters and radio resources corresponding to the cell clusters may be classified based on a service. The user terminal in this embodiment can further avoid an unnecessary workload of reading a system message.

Optionally, the user terminal may select a specific cell based on a cell cluster in the system message, or may select a cell cluster before selecting a specific cell and then determine, in combination with other information of cells in the cell cluster, a cell that needs to be used. For example, the user terminal may first select a cell cluster 2, and then select, based on statuses of a corresponding cell a, cell b, or cell c in the cell cluster 2, the cell c for use, for example, the cell cluster 2 has a low-delay feature. The statuses of the cells may use a conventional technical means, for example, information such as a wireless condition and a geographical location. For example, information such as reference signal received power (RSRP)/reference signal received quality (RSRQ) may be used as a reference means. The user terminal can select a cell that is close to the user terminal and that has a good channel condition.

Optionally, after selecting a required cell, the user terminal may choose to further establish communication with the cell or camp on the cell. In this case, the user terminal needs to obtain access information of the cell. Similar to the description about the access information of the information about the cell cluster in Embodiment 2, the user terminal may trigger an inquiry mechanism to obtain necessary access information, or may obtain necessary access information based on the access information in the information about the cell cluster. The access information includes but is not limited to cell selection/reselection information, GPS information, CDMA 2000 information, WLAN and LTE aggregation information, and MBMS information.

Embodiment 4

Figure 7:
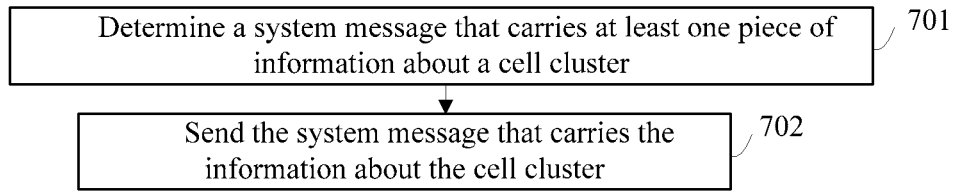
FIG. 7 is a schematic diagram of a method for sending a system message according to an embodiment of the present invention.

Similar to the network device in Embodiment 2, this embodiment further provides a method for sending a system message. FIG. 7 shows the method, and the method includes the following steps:

701. A network device determines a system message that carries at least one piece of information about a cell cluster, where the cell cluster includes a set of at least one cell, and the information about the cell cluster includes at least one piece or a combination of characteristic information of the cell cluster, public information of the cell cluster, access information of the cell cluster, or other information of the cell cluster.

702. The network device sends the system message that carries the information about the cell cluster.

The method in this embodiment may comply with and use the foregoing specifications of the cell cluster and definition manners of the information about a cell cluster, and details are not described herein again. The method in this embodiment may be performed by the network device in Embodiment 2, and similar advantages may be achieved.

Optionally, the sending, by the network device, the system message that carries the information about the cell cluster includes: sending, by the network device in at least one of the following manners, the system message that carries the information about the cell cluster: broadcast, multicast, or dedicated signaling.

Optionally, access information of the cell includes at least a part of information carried in a master information block (MIB), a SIB 1, or a SIB 2.

Optionally, a network node corresponding to a cell in the information about the cell cluster has a same coverage area as the network device, or the network node is adjacent to the network device. The network device may alternatively be an network node corresponding to one or more cells in the information about the cell cluster. It may be learned that the network device in this embodiment may be but is not limited to a network node having a large coverage area, and a network node that can send system information that includes information about a cell cluster may be the network device. When applied to different scenarios, the embodiment may achieve corresponding advantages and effects.

When the network device is a network node corresponding to one or more cells in the information about the cell cluster, the network device sends a part of access information that is of a cell and that is in the access information of the cell cluster, or may send a part of a system message that is of a cell and that is in the other information of the cell cluster. Herein, the access information of the cell may be a part of or the same as the access information of the cell cluster. The other information of the cell cluster is also similar to the system message of the cell, provided that the sent information is information required by the user terminal during access.

Optionally, when a length of a SIB including information about a cell cluster is greater than a maximum size of a block sent at a TTI, the SIB is segmented, and segmented SIBs are sent in a send window.

Optionally, the sending, by the network device, the system message that carries the information about the cell cluster includes: sending, by the network device by using a multimedia broadcast multicast service single frequency network (MBSFN), the system message that carries the information about the cell cluster, where the network device is a plurality of network devices of a network node related to a central control node of at least one cell cluster.

Embodiment 5

Figure 8:
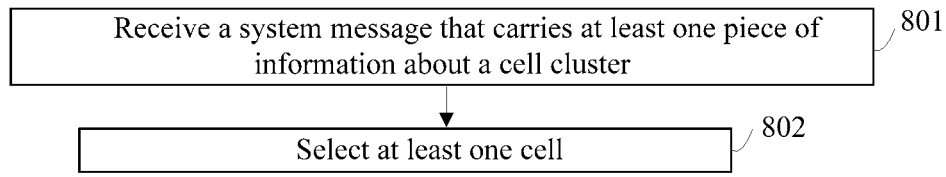
FIG. 8 is a schematic diagram of a method for receiving a system message according to an embodiment of the present invention.

Similar to the user terminal in Embodiment 3, this embodiment further provides a method for receiving a system message. FIG. 8 shows a method for receiving a system message, and the method includes the following steps:

801. A user terminal receives a system message that carries at least one piece of information about a cell cluster, where the cell cluster includes a set including at least one cell, and the information about the cell cluster includes at least one piece or a combination of characteristic information of the cell cluster, public information of the cell cluster, access information of the cell cluster, or another system message of the cell cluster.

802. The user terminal selects at least one cell based on the system message, where the selected cell is a cell indicated in the information about the cell cluster.

The method in this embodiment may comply with and use the foregoing specifications of the cell cluster and definition manners of the information about a cell cluster, and details are not described herein again. The method in this embodiment may be performed by the user terminal in Embodiment 3, and similar advantages may be achieved. It may be understood that this embodiment corresponds to Embodiment 3, and therefore same or similar parts are not described herein again.

The method in this embodiment has the following advantages: A system message that has information about a cell cluster may be scheduled, and scheduling flexibility is improved, so that cell clusters and radio resources corresponding to the cell clusters may be classified based on a service. The method in this embodiment can further avoid an unnecessary workload of reading a system message.

Optionally, the user terminal may select one cell cluster based on the characteristic information of the cell cluster, and select at least one cell, where the selected at least one cell is a cell in the cell cluster.

Optionally, the selecting, by the user terminal, at least one cell based on the system message includes: obtaining, by the user terminal, access information of the cell based on the selected cell.

Optionally, the obtaining, by the user terminal, access information of the cell based on the selected cell includes: obtaining, by the user terminal, the access information from the selected cell, where the access information includes the access information of the selected cell. Optionally, the obtaining, by the user terminal, access information of the cell based on the selected cell includes: obtaining, by the user terminal, the access information of the selected cell from the access information that is of the cell cluster and that is in the information about the cell cluster.

The foregoing describes the devices and methods for sending and receiving a system message by using the information about the cell cluster. The following describes devices and methods for processing a system message based on information about a cell cluster.

Embodiment 6

Figure 9:
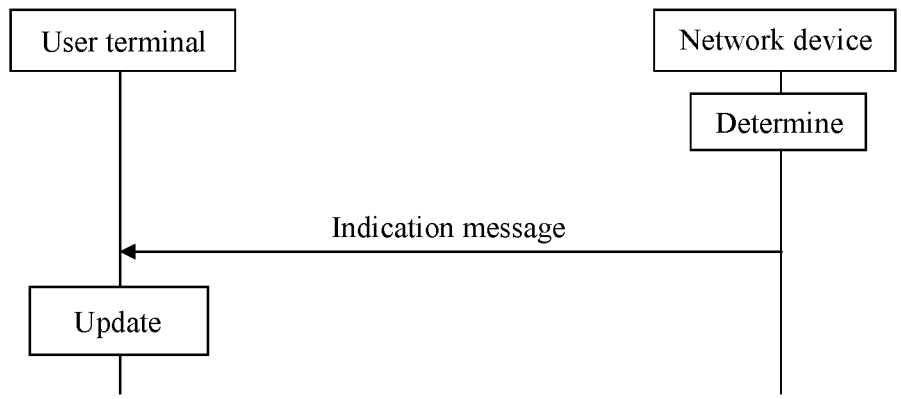
FIG. 9 is a schematic diagram of communication according to an embodiment of the present invention.

Referring to FIG. 9, two communication parties comply with the foregoing specifications of the cell cluster and definition Manner 1 to Manner 5 of the information about a cell cluster. There may be a case in which system information needs to be updated. Generally, at least the following notification manners for a system message change may be used: 1. A network side uses an indication message carrying a notification, to notify a user terminal of a system information change, and the user terminal starts to monitor a new system message in a next modification period. 2. Label information is carried in the system message, and the user terminal reads a label. If the label has changed, it indicates that the system information has changed, and the user terminal needs to read the system message again. 3. An obtained system message has a validity period, and when the validity period expires, the user terminal needs to read the system message again.

It should be noted that the system message in this embodiment carries information about a cell cluster. Corresponding processing on the network side and a user side has an obvious characteristic, that is, different processing needs to be provided based on information about a cell cluster in the cell cluster. Because network structures of cell clusters are different, manners of updating a corresponding system message may be different. 1. The indication message carrying the notification on the network side may carry only system information of a cell cluster currently required by the user terminal. The user terminal may correspondingly receive the indication message. Alternatively, the indication message on the network side still indicates whether at least one piece of system information of a cell cluster has changed, the user terminal receives only one or a part of these indication messages, and the received indication message or a part of the information indicates whether the currently required system information of the cell cluster has changed. 2. The label information on the network side indicates that the at least one piece of system information of the cell cluster has changed. The user terminal reads the label information. If it is found that the indicated cell cluster/cell whose system information has changed is just the cell in the cell cluster required by the user terminal, the system message is read again. 3. When the user terminal determines that the validity period of the obtained system message expires, the user terminal reads again, according to currently used specifications of a cell cluster and/or definition manners of information about a cell cluster, the system information carried in the required information about the cell cluster.

Correspondingly, the user terminal receives, based on a processing manner corresponding to a network device, a system message that carries at least one piece of information about a cell cluster, so as to obtain required data from the system message for further processing. Although the user terminal usually accesses one cell, this embodiment further includes a case in which the user terminal simultaneously accesses a plurality of cells or is ready to access a plurality of cells. The plurality of cells may be from a plurality of cell clusters, or from one cell cluster. Therefore, the cell cluster or cell required by the user terminal includes a cell cluster or a cell currently used by the user terminal, and also includes a cell cluster or a cell to be used by the user terminal.

Because a concept of a cell cluster is used, that is, information about the cell cluster is carried in a system message, by using the information about the cell cluster, the network device can send information that needs to be updated, and the user terminal can obtain data required for updating. Therefore, the network device and the user terminal can cope with a challenge brought by a multi-layer cell structure.

Embodiment 7

This embodiment describes a network device.

Figure 10:
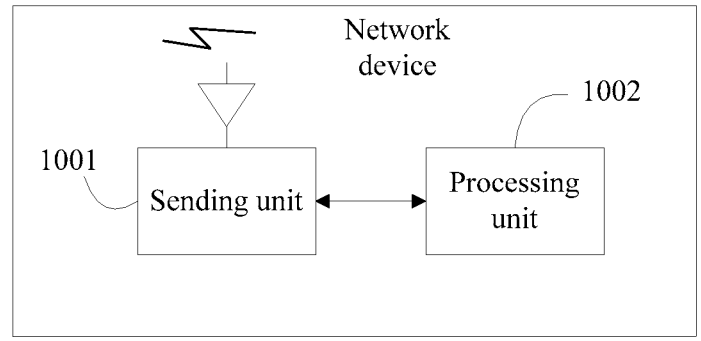
FIG. 10 is a schematic diagram of a network device according to an embodiment of the present invention.

FIG. 10 shows a network device, and the network device includes:

a processing unit 1002, configured to determine a cell cluster corresponding to system information that needs to be updated, where the cell cluster includes a set of at least one cell, and information about the cell cluster includes at least one piece or a combination of characteristic information of the cell cluster, public information of the cell cluster, access information of the cell cluster, or other information of the cell cluster; and a sending unit 1001, configured to send indication information, where the indication information indicates that a system message of the cell cluster has changed or whether a system message of the cell cluster has changed.

The processing unit of the network device in this embodiment may use the foregoing specifications of the cell cluster and definition manners of the information about a cell cluster, and details are not described herein again. The sending unit of the network device may comply with the foregoing specifications of the cell cluster and definition manners of the information about a cell cluster to send the indication information. The network device in this embodiment may perform a method in Embodiment 9.

The network device in this embodiment has the following advantages: The network device may schedule a system message that has information about a cell cluster, and scheduling flexibility is improved, so that cell clusters and radio resources corresponding to the cell clusters may be classified based on a service.

The system message of the cell cluster herein is information related to the cell cluster, including but not limited to the information about the cell cluster, and system information of a cell in the cell cluster. When two communication parties specify that a meaning of the foregoing indication information is that the system message of the cell cluster has changed, this means that when the indication information appears, the system message of the cell cluster has changed, and when the indication information does not appear, the system message of the cell cluster has not changed. When two communication parties specify that a meaning of the foregoing indication information is whether the system message of the cell cluster has changed, this means that a value of the indication information corresponds to a state of the system message of the cell cluster. When the value of the indication information is a first value, for example, 1, the system message of the cell cluster has changed, or when the value of the indication information is a second value, for example, 0, the system message of the cell cluster has not changed. Alternatively, when the value of the indication information is different from a value of indication information previously obtained by user equipment, the system message of the cell cluster has changed, or when the value of the indication information is the same as a value of indication information previously obtained by the user equipment, the system message of the cell cluster has not changed.

Optionally, a similar manner may be used to indicate that a system message of a cell in the cell cluster has changed or whether a system message of a cell in the cell cluster has changed. A quantity of cells herein is not limited, and there may be a plurality of cells, provided that the two communication parties agree on a meaning represented by the indication information, or know, in another manner, a meaning represented by the indication information. If necessary, the two parties may prestore a table, and keep a corresponding mapping relationship. If the indication information is selected to indicate system information of a cell in the cell cluster, the indication information may no longer indicate system information of the cell cluster, and other indication information may be selected to indicate the system information of the cell cluster.

In a particular case, similar to the foregoing identification information for implicitly indicating the cell cluster, implicit indication information is also included in this embodiment. That is, the two communication parties agree on that indication information that meets a specific condition and that does not appear may indicate that the system message of the cell cluster or the cell has changed.

Optionally, the indication information may be carried in a system message, for example, in a MIB or a SIB of the system message. The indication information may alternatively be carried in a system information update message. The system information update message may be a conventional paging message, an RRC message, or MAC signaling, or may be signaling sent by using a physical control channel or a synchronization channel. The indication information may be a field or a unit in the foregoing signaling. This means that other information other than the system message is used for implementation.

Optionally, in order to complete an indication function, the indication information sent by the network device may further include: an index number, of a cell cluster, configured by the network device. The network device adds the indication information to the physical control channel (for example, a physical downlink control channel, PDCCH) that is to be sent and used to schedule the system information update message. For example, the network device configures, by using the RRC message, that an index number of a cell cluster 1 is 0, an index number of a cell cluster 2 is 1, an index number of a cell cluster 3 is 2, and an index number of a cell cluster 4 is 3. In a corresponding indication field of the PDCCH, if bits are 00, it indicates that a system message of the cell cluster 1 has changed, or if bits are 11, it indicates that a system message of the cell cluster 4 has changed. The indication field may indicate a plurality of cell clusters.

Optionally, the indication information may be a radio network temporary identifier (RNTI), corresponding to a cell cluster, configured by the network device, and when sending a physical control channel that is used to schedule the system information update message, the network device uses the indication information to perform a cyclic redundancy check (CRC) operation.

Optionally, the indication information is a channel configuration parameter, corresponding to a cell cluster, configured by the network device, for example, a demodulation reference signal (DM-RS), a channel status information reference signal (CSI-RS), and a scrambling sequence index (SCID), and the network device uses the channel configuration parameter in the indication information to configure a physical control/data channel of the system information update message.

Optionally, the indication information is a resource location in time domain and/or a resource location in frequency domain at which the network device sends a system update message corresponding to a cell cluster, or a parameter required for calculating a resource location in time domain and/or a resource location in frequency domain of a system update message corresponding to a cell cluster, for example, a discontinuous reception (DRX) cycle of UE, UE_ID, and a cell cluster ID. For example, the indication information may be a PF/PO for indicating a time domain location of a system update paging message. The network device uses the resource location indicated in the indication information, to send the system information update message. The paging frame PF (paging frame) is a radio frame that may include one or more paging occasions POs (paging occasion). A PO is a subframe. The UE needs to detect only one PO in a paging cycle. That is, for UE, a PF is a radio frame for sending a paging message, and a PO is a subframe for sending the paging message in the PF. An example is as follows:

(1) The network device directly configures the resource location in time domain and/or the resource location in frequency domain at which the network device sends the system update message corresponding to the cell cluster, for example, value ranges of a PF 1 and a PO 1 of the cell cluster 1, value ranges of a PF 2 and a PO 2 of the cell cluster 2, . . .

(2) The user equipment derives, based on parameters such as the DRX cycle of the UE, UE_ID, and the cell cluster ID, the resource location in time domain and/or the resource location in frequency domain at which the network device sends the system update message corresponding to the cell cluster. A derivation method is described by using an example, and the following method is used to distinguish, in terms of the PO, that is, in terms of subframe division, different time domain locations at which the network device sends system update messages corresponding to cell clusters.

The PF is a radio frame that meets the following formula:

$$\text{SFN mod } T = (T \text{ div } N) \times (\text{UE\_ID mod } N)$$

The PO (for FDD) may be learned by querying the following table.

| Ns | PO when i_s = 0 | PO when i_s = 1 | PO when i_s = 2 |
|----|-----------------|-----------------|-----------------|
| 1  | 9               | N/A             | N/A             |
| 2  | 4               | 9               | N/A             |
| 4  | 0               | 4               | 5               |

Index i_s: i_s=(floor(UE_ID/N) mod Ns) mod cell cluster_ID, where i_s is an index used to query the table; N is an intermediate variable, and may be min(T, nB); Ns is an intermediate variable, and may be max(1, nB/T); SFN is a system frame number system frame number; T is the DRX cycle of the UE, and is set to a smaller value between a DRX cycle value assigned by a high layer to the UE and a default DRX value configured by the network device. nB may be 4T, 2T, T, T/2, T/4, T/8, T/16, or T/32. UE_ID may be IMSI mod 1024. mod means modulo, and div means divisible.

Alternatively, a derivation method is described by using an example, and the following method is used to distinguish, in terms of the PF, that is, in terms of radio frame division, different time domain locations at which the network device sends system update messages corresponding to cell clusters.

For example, cell cluster IDs start from 1, for example, a cell cluster 1, a cell cluster 2, a cell cluster 3, and a cell cluster 4. The PF is a radio frame that meets the following formula:

$$(SFN-T2\times(\text{cell cluster\_ID}-1))\bmod T2=(T2\text{ div }N2)\times(UE\_ID\bmod N2)$$

T2=T div (cell cluster quantity)
N2=min(T2, nB)

The PO (for FDD) may be learned by querying the following table.

| Ns | PO when i_s = 0 | PO when i_s = 1 | PO when i_s = 2 |
|----|-----------------|-----------------|-----------------|
| 1  | 9               | N/A             | N/A             |
| 2  | 4               | 9               | N/A             |
| 4  | 0               | 4               | 5               |

Index i_s: i_s=(floor(UE_ID/N) mod Ns) mod cell cluster_ID, where i_s is an index used to query the table; N is an intermediate variable, and may be min(T, nB); Ns is an intermediate variable, and may be max(1, nB/T); SFN is a system frame number system frame number; T is the DRX cycle of the UE, and is set to a smaller value between a DRX cycle value assigned by a high layer to the UE and a default DRX value configured by the network device. nB may be 4T, 2T, T, T/2, T/4, T/8, T/16, or T/32. UE_ID may be IMSI mod 1024. mod means modulo, and div means divisible.

The foregoing lists only some forms of the indication information. A person in the art may understand that the indication information is not limited thereto. Any form of indication information that can be used to complete a function of indicating that the system message of the cell cluster has changed or whether the system message of the cell cluster has changed or a function of indicating that the system message of the cell in the cell cluster has changed or whether the system message of the cell in the cell cluster has changed can be used to implement the solutions in this embodiment.

By using different forms of indication information, the network device can effectively send a system message that needs to be updated.

Embodiment 8

Corresponding to Embodiment 7, this embodiment describes a user terminal.

Figure 11:
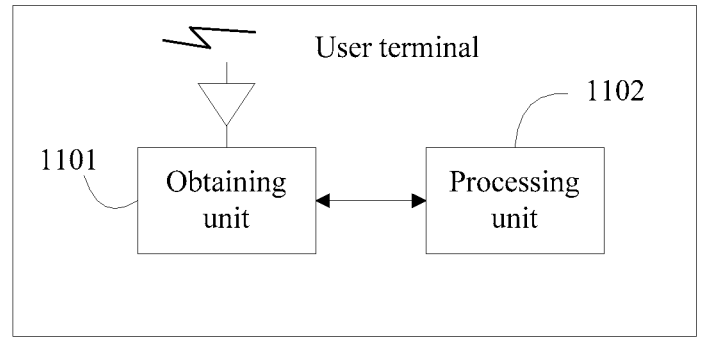
FIG. 11 is a schematic diagram of a user terminal according to an embodiment of the present invention.

FIG. 11 shows a user terminal, and the user terminal includes:

an obtaining unit 1101, configured to obtain indication information, where the indication information indicates that a system message of a cell cluster has changed or whether a system message of a cell cluster has changed, the cell cluster includes a set of at least one cell, and information about the cell cluster includes at least one piece or a combination of characteristic information of the cell cluster, public information of the cell cluster, access information of the cell cluster, or another system message of the cell cluster; and a processing unit 1102, configured to determine whether currently used information about the cell cluster needs to be updated.

The processing unit of the user terminal in this embodiment may use the foregoing specifications of the cell cluster and definition manners of the information about a cell cluster, and details are not described herein again. The obtaining unit may comply with the foregoing specifications of the cell cluster and definition manners of the information about a cell cluster to obtain the indication information. The user terminal in this embodiment may perform a method in Embodiment 10.

The obtaining unit herein may be a receiving unit configured to receive the indication information, or may be a processing unit configured to determine the indication information. The processing unit may determine the indication information by agreeing on the indication information in advance. In a particular case, similar to the foregoing identification information for implicitly indicating the cell cluster, implicit indication information is also included in this embodiment. That is, two communication parties agree on that indication information that meets a specific condition and that does not appear may indicate that a system message of the cell cluster or a cell has changed.

The user terminal in this embodiment has the following advantages: The user terminal may obtain, for updating, a system message that has information about a cell cluster, and scheduling flexibility is improved, so that cell clusters and radio resources corresponding to the cell clusters may be classified based on a service.

The system message of the cell cluster herein is information related to the cell cluster, including but not limited to the information about the cell cluster, and system information of a cell in the cell cluster, which is similar to Embodiment 7, and details are not described herein again. Optionally, a similar manner may be used to indicate that a system message of a cell in the cell cluster has changed or whether a system message of a cell in the cell cluster has changed.

Optionally, the indication information is carried in a system information update message.

That the user terminal obtains indication information includes: the user terminal obtains the system information update message, where the system information update message is a paging message, an RRC message, MAC signaling, or signaling sent by using a physical control channel or a synchronization channel; and that the user terminal determines whether currently used information about the cell cluster needs to be updated includes: the user terminal updates the currently used information about the cell cluster based on the indication information in the system information update message; and/or the user terminal updates a system message of a cell in a currently used cell cluster based on the indication information in the system information update message.

Optionally, the indication information is carried in a system message.

That the user terminal obtains indication information includes: the user terminal obtains the system message, where the system message indicates a currently used cell cluster; and that the user terminal determines, based on the indication information, whether currently used information about the cell cluster needs to be updated includes: the user terminal updates the currently used information about the cell cluster based on the indication information in the system message; and/or the user terminal updates a system message of a cell in the currently used cell cluster based on the indication information in the system message.

That the system message carries the indication information is used as an example, and the user terminal currently uses a cell cluster 2 whose feature is that a carrier frequency is a frequency band 1. When reading a system message, if a user finds that a change of a system message of the cell cluster 2 is indicated in a MIB or a SIB of the system message, when the user determines that the system message of the cell cluster 2 needs to be updated, the user only needs to obtain a part that is for the cell cluster 2 and that is in the system message, and read again and update the part corresponding to the cell cluster 2. In this way, a required system message can be updated quickly without reading excessive system messages.

That the system information update message carries the indication information is used as an example, and the user terminal currently uses a cell cluster 2 whose feature is that a carrier frequency is a frequency band 1. When receiving a system information update message, if a user finds that a change of a system message of the cell cluster 2 is indicated in the system information update message, when the user determines that the system message of the cell cluster 2 needs to be updated, the user only needs to obtain a part that is for the cell cluster 2 and that is in the system message, and read again and update the part corresponding to the cell cluster 2. In this way, a required system message can be updated quickly without reading excessive system messages.

Optionally, that the user terminal obtains the system message includes: the user terminal monitors a system message corresponding to the currently used information about the cell cluster.

It may be understood that the currently used information about the cell cluster may include information about the cell cluster that is to be used but is not used yet. In this scenario, the user terminal has established communication with a cell, and the user terminal still needs to establish a connection to another cell. Therefore, there is a need to further update the information about the cell cluster that may be used but is not used yet. In the technical solution, only content of the information about the cell cluster needs to be adjusted. For other technical details, refer to specific solutions of the embodiments. In this way, flexibility of the user terminal is improved, and required information about the cell cluster can be flexibly selected as required.

Optionally, the user terminal updates the currently used information about the cell cluster based on the indication information. When the indication information indicates that the currently used information about the cell cluster needs to be updated, the user terminal triggers an update process. When the indication information indicates that the currently used information about the cell cluster does not need to be updated, the user terminal does not trigger an update process.

In a possible manner, the user terminal may skip the "determining" process, that is, skip determining whether the currently used information about the cell cluster needs to be updated, and directly perform the update process. Because the user terminal triggers an update, the update may be considered as one type of the "determining" process.

Optionally, that the user terminal determines whether currently used information about the cell cluster needs to be updated further includes:

the indication information is a received index number, of a cell cluster, configured by a network device; and the user terminal reads the indication information carried in a received physical control channel (for example, a PDCCH) that is used to schedule the system information update message. For example, index numbers that are of cell clusters, that are previously received by the user terminal, and that are configured by the network device by using the RRC message are as follows: An index number of the cell cluster 1 is 0, an index number of the cell cluster 2 is 1, an index number of a cell cluster 3 is 2, and an index number of a cell cluster 4 is 3. If the user terminal currently uses the cell cluster 1, when reading a corresponding indication field of the PDCCH, if bits in the indication field are 00, the user terminal considers that a system message of the cell cluster 1 has changed, so as to read and update information about the currently used cell cluster 1; or if bits in the indication field are 11, the user terminal considers that a system message of the cell cluster 4 has changed, and the user terminal does not trigger the update process. In addition, the indication field may indicate a plurality of cell clusters.

Optionally, that the user terminal determines whether currently used information about the cell cluster needs to be updated further includes:

the indication information is a received radio network temporary identifier (RNTI), corresponding to a cell cluster, configured by a network device; and the user terminal uses the indication information to perform a CRC operation on a physical control channel that is used to schedule the system information update message. For example, RNTIs that are of cell clusters, that are previously received by the user terminal, and that are configured by the network device by using the RRC message are as follows: An RNTI of the cell cluster 1 is P1-RNTI, an RNTI of the cell cluster 2 is P2-RNTI, an RNTI of the cell cluster 3 is P3-RNTI, and an RNTI of the cell cluster 4 is P4-RNTI. If the user terminal currently uses the cell cluster 1, the P1-RNTI is used to perform a CRC operation on the PDCCH, and if the CRC operation is successful, the user terminal considers that a system message of the cell cluster 1 has changed, so as to read and update information about the currently used cell cluster 1; or if the CRC operation fails, the user terminal considers that a system message of the cell cluster 1 has not changed, and the user terminal does not trigger the update process. If the user terminal currently uses the cell cluster 1 and the cell cluster 4, the UE may perform a CRC operation on the PDCCH separately by using the P1-RNTI and the P4-RNTI.

Optionally, that the user terminal determines whether currently used information about the cell cluster needs to be updated further includes:

the indication information is a received channel configuration parameter, corresponding to a cell cluster, configured by a network device, for example, a demodulation reference signal (DM-RS), a channel status information reference signal (CSI-RS), and a scrambling sequence index (SCID), and the user terminal uses the channel configuration parameter in the indication information to read a physical control/data channel of the system information update message. For example, the user terminal previously receives a channel configuration parameter of a cell cluster that is configured by the network device by using the RRC message. If the user terminal currently uses the cell cluster 1, a channel configuration parameter of the cell cluster 1 is used to read the physical control/data channel of the system information update message. If the reading is successful, the user terminal considers that a system message of the cell cluster 1 has changed, so as to read and update information about the currently used cell cluster 1; or if the reading fails, the user terminal considers that a system message of the cell cluster 1 has not changed, and the user terminal does not trigger the update process.

Optionally, that the user terminal determines whether currently used information about the cell cluster needs to be updated further includes:

the indication information is a resource location in time domain and/or a resource location in frequency domain at which the user terminal receives a system update message corresponding to a cell cluster, or a parameter required for calculating a resource location in time domain and/or a resource location in frequency domain at which a system update message corresponding to a cell cluster is sent, for example, a DRX cycle of UE, UE_ID, and a cell cluster ID. For example, the indication information may be a PF/PO for indicating a time domain location of a system update paging message. The user terminal uses the resource location indicated in the indication information, to receive the system information update message. The paging frame PF (paging frame) is a radio frame that may include one or more paging occasions POs (paging occasion). A PO is a subframe. The user terminal needs to detect only one PO in a paging cycle. That is, for a user terminal, a PF is a radio frame for sending a paging message, and a PO is a subframe for sending the paging message in the PF. An example is as follows:

(1) The user terminal receives the resource location in time domain and/or the resource location in frequency domain, directly configured by the network device, at which the network device sends the system update message corresponding to the cell cluster, for example, value ranges of a PF 1 and a PO 1 of the cell cluster 1, value ranges of a PF 2 and a PO 2 of the cell cluster 2, . . .

(2) The user equipment derives, based on parameters such as the DRX cycle of the UE, UE_ID, and the cell cluster ID, the resource location in time domain and/or the resource location in frequency domain at which the network device sends the system update message corresponding to the cell cluster. A derivation method is described by using an example, and the following method is used to distinguish, in terms of the PO, that is, in terms of subframe division, different time domain locations at which the network device sends system update messages corresponding to cell clusters.

The PF is a radio frame that meets the following formula:

SFN mod $T=(T$ div $N)\times($UE_ID mod $N)$

The PO (for FDD) may be learned by querying the following table.

| Ns | PO when i_s = 0 | PO when i_s = 1 | PO when i_s = 2 |
|---|---|---|---|
| 1 | 9 | N/A | N/A |
| 2 | 4 | 9 | N/A |
| 4 | 0 | 4 | 5 |

Index i_s: i_s=(floor(UE_ID/N) mod Ns) mod cell cluster_ID, where i_s is an index used to query the table; N is an intermediate variable, and may be min(T, nB); Ns is an intermediate variable, and may be max(1, nB/T); SFN is a system frame number system frame number; T is the DRX cycle of the UE, and is set to a smaller value between a DRX cycle value assigned by a high layer to the UE and a default DRX value configured by the network device. nB may be 4T, 2T, T, T/2, T/4, T/8, T/16, or T/32. UE_ID may be IMSI mod 1024. mod means modulo, and div means divisible.

Alternatively, a derivation method is described by using an example, and the following method is used to distinguish, in terms of the PF, that is, in terms of radio frame division, different time domain locations at which the network device sends system update messages corresponding to cell clusters.

For example, cell cluster IDs start from 1, for example, a cell cluster 1, a cell cluster 2, a cell cluster 3, and a cell cluster 4. The PF is a radio frame that meets the following formula:

(SFN-$T2\times$(cell cluster_ID-1))mod $T2=(T2$ div $N2)\times$
(UE_ID mod $N2$)

T2=T div (cell cluster quantity)
N2=min(T2, nB)

The PO (for FDD) may be learned by querying the following table.

| Ns | PO when i_s = 0 | PO when i_s = 1 | PO when i_s = 2 |
|---|---|---|---|
| 1 | 9 | N/A | N/A |
| 2 | 4 | 9 | N/A |
| 4 | 0 | 4 | 5 |

Index i_s: i_s=(floor(UE_ID/N) mod Ns) mod cell cluster_ID, where i_s is an index used to query the table; N is an intermediate variable, and may be min(T, nB); Ns is an intermediate variable, and may be max(1, nB/T); SFN is a system frame number system frame number; T is the DRX cycle of the UE, and is set to a smaller value between a DRX cycle value assigned by a high layer to the UE and a default DRX value configured by the network device. nB may be 4T, 2T, T, T/2, T/4, T/8, T/16, or T/32. UE_ID may be IMSI mod 1024. mod means modulo, and div means divisible.

The user terminal uses the resource location indicated in the indication information, to receive the system information update message. For example, if the user terminal currently uses the cell cluster 1, a resource location in time domain and/or a resource location in frequency domain at which a system update message corresponding to the cell cluster 1 is sent are used to monitor the system information update message. If the system information update message is successfully received, the user terminal considers that a system message of the cell cluster 1 has changed, so as to read and update information about the currently used cell cluster 1; or if the system information update message is not successfully received, the user terminal considers that a system message of the cell cluster 1 has not changed, and the user terminal does not trigger the update process.

The foregoing lists only some forms of the indication information. A person in the art may understand that the indication information is not limited thereto. Any form of indication information that can be used to complete a function of indicating that the system message of the cell cluster has changed or whether the system message of the cell cluster has changed or a function of indicating that the system message of the cell in the cell cluster has changed or whether the system message of the cell in the cell cluster has changed can be used to implement the solutions in this embodiment.

By using different forms of indication information, the user terminal can effectively update a system message that needs to be updated.

Embodiment 9

Figure 12:
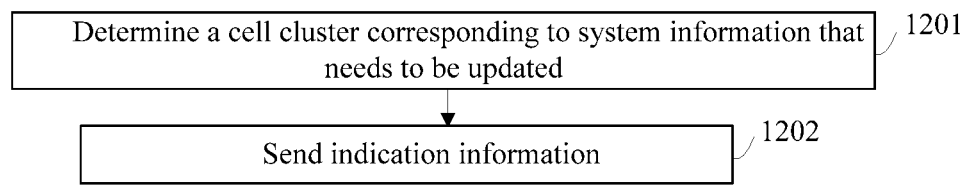
FIG. 12 is a schematic diagram of a method for processing a system message according to an embodiment of the present invention.

Similar to the network device in Embodiment 7, this embodiment further provides a method for processing a system message. FIG. 12 shows the method, and the method includes the following steps:

1201. A network device determines a cell cluster corresponding to system information that needs to be updated, where the cell cluster includes a set of at least one cell, and information about the cell cluster includes at least one piece or a combination of characteristic information of the cell cluster, public information of the cell cluster, access information of the cell cluster, or other information of the cell cluster.

1202. The network device sends indication information, where the indication information indicates that a system message of the cell cluster has changed or whether a system message of the cell cluster has changed.

The method in this embodiment has the following advantages: A system message that has information about a cell cluster may be scheduled, and scheduling flexibility is improved, so that cell clusters and radio resources corresponding to the cell clusters may be classified based on a service.

The method in this embodiment may comply with and use the foregoing specifications of the cell cluster and definition manners of the information about a cell cluster, and details are not described herein again. The method in this embodiment may be performedby the network device in Embodiment 7, and similar advantages may be achieved. Same or similar parts are not described herein again.

Optionally, the indication information indicates that a system message of a cell in the cell cluster has changed or whether a system message of a cell in the cell cluster has changed.

Optionally, the indication information is carried in at least one of the following messages: a system message, or a system information update message, where the system information update message is a paging message, an RRC message, MAC signaling, or signaling sent by using a physical control channel or a synchronization channel.

Optionally, the sending, by the network device, indication information further includes:

the indication information is an index number, of a cell cluster, configured by the network device; and the network device adds the indication information to a physical control channel that is to be sent and used to schedule the system information update message; or the indication information is a radio network temporary identifier (RNTI), corresponding to a cell cluster, configured by the network device; and when sending a physical control channel that is used to schedule the system information update message, the network device uses the indication information to perform a cyclic redundancy check (CRC) operation; or the indication information is a channel configuration parameter, corresponding to a cell cluster, configured by the network device; and the network device uses the channel configuration parameter in the indication information to configure a physical control/data channel of the system information update message; or the indication information is a resource location in time domain and/or a resource location in frequency domain at which a system update message, corresponding to a cell cluster, configured by the network device is sent; and the network device uses the resource location indicated in the indication information, to send the system information update message.

Embodiment 10

Figure 13:
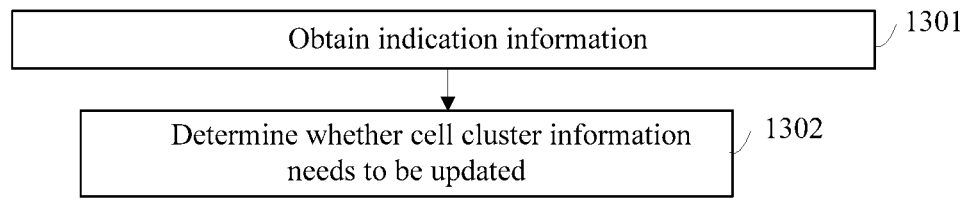
FIG. 13 is a schematic diagram of another method for processing a system message according to an embodiment of the present invention.

Similar to the user terminal in Embodiment 8, this embodiment further provides a method for processing a system message. FIG. 13 shows the method, and the method includes the following steps:

1301. A user terminal obtains indication information, where the indication information indicates that a system message of a cell cluster has changed or whether a system message of a cell cluster has changed, the cell cluster includes a set of at least one cell, and information about the cell cluster includes at least one piece or a combination of characteristic information of the cell cluster, public information of the cell cluster, access information of the cell cluster, or another system message of the cell cluster.

1302. The user terminal determines whether currently used information about the cell cluster needs to be updated.

The method in this embodiment has the following advantages: A system message that has information about a cell cluster may be obtained for updating, and scheduling flexibility is improved, so that cell clusters and radio resources corresponding to the cell clusters may be classified based on a service.

The method in this embodiment may comply with and use the foregoing specifications of the cell cluster and definition manners of the information about a cell cluster, and details are not described herein again. The method in this embodiment may be performedby the user terminal in Embodiment 8, and similar advantages may be achieved. Therefore, same or similar parts are not described herein again.

Optionally, the indication information is carried in a system information update message.

The obtaining, by a user terminal, indication information includes:

obtaining, by the user terminal, the system information update message, where the system information update message is a paging message, an RRC message, MAC signaling, or signaling sent by using a physical control channel or a synchronization channel.

The determining, by the user terminal, whether currently used information about the cell cluster needs to be updated includes:

updating, by the user terminal, the currently used information about the cell cluster based on the indication information in the system information update message; and/or updating, by the user terminal, a system message of a cell in a currently used cell cluster based on the indication information in the system information update message.

Optionally, the indication information is carried in a system message.

The obtaining, by a user terminal, indication information includes:

obtaining, by the user terminal, the system message, where the system message indicates a currently used cell cluster.

The determining, by the user terminal based on the indication information, whether currently used information about the cell cluster needs to be updated includes:

updating, by the user terminal, the currently used information about the cell cluster based on the indication information in the system message; and/or updating, by the user terminal, a system message of a cell in the currently used cell cluster based on the indication information in the system message.

Optionally, the obtaining, by the user terminal, the system message includes:

monitoring, by the user terminal, a system message corresponding to the currently used information about the cell cluster.

Optionally, the currently used information about the cell cluster includes information about the cell cluster that is to be used but is not used yet.

Optionally, the obtaining, by a user terminal, indication information further includes:

the indication information is a received index number, of a cell cluster, configured by a network device; and the user terminal reads the indication information carried in a received physical control channel that is used to schedule the system information update message; or the indication information is a received radio network temporary identifier (RNTI), corresponding to a cell cluster, configured by a network device; and the user terminal uses the indication information to perform a CRC operation on a physical control channel that is used to schedule the system information update message; or the indication information is a received channel configuration parameter, corresponding to a cell cluster, configured by a network device; and the user terminal uses the channel configuration parameter in the indication information to read a physical control/data channel of the system information update message; or the indication information is a resource location in time domain and/or a resource location in frequency domain at which a network device sends a system update message corresponding to a cell cluster; and the user terminal uses the resource location indicated in the indication information, to receive the system information update message.

Embodiment 11

This embodiment further provides a communications system, including the network device described in Embodiment 2 and the user terminal in Embodiment 3. The solution of this embodiment is compatible with Embodiment 1, and has similar advantages.

This embodiment further provides a communication method, including the steps in the method for sending a system message described in Embodiment 4 and the steps in the method for receiving a system message in Embodiment 5. The solution of this embodiment is compatible with Embodiment 1, and has similar advantages.

Embodiment 12

This embodiment further provides a communications system, including the network device described in Embodiment 7 and the user terminal in Embodiment 8. The solution of this embodiment is compatible with Embodiment 6, and has similar advantages.

This embodiment further provides a communication method, including the steps in the method for processing a system message described in Embodiment 9 and the steps in the method for processing a system message in Embodiment 10. The solution of this embodiment is compatible with Embodiment 6, and has similar advantages.

Embodiment 13

This embodiment describes a method and an apparatus for calling by using information about a cell cluster, for example, a paging message of an incoming call.

Figure 16:
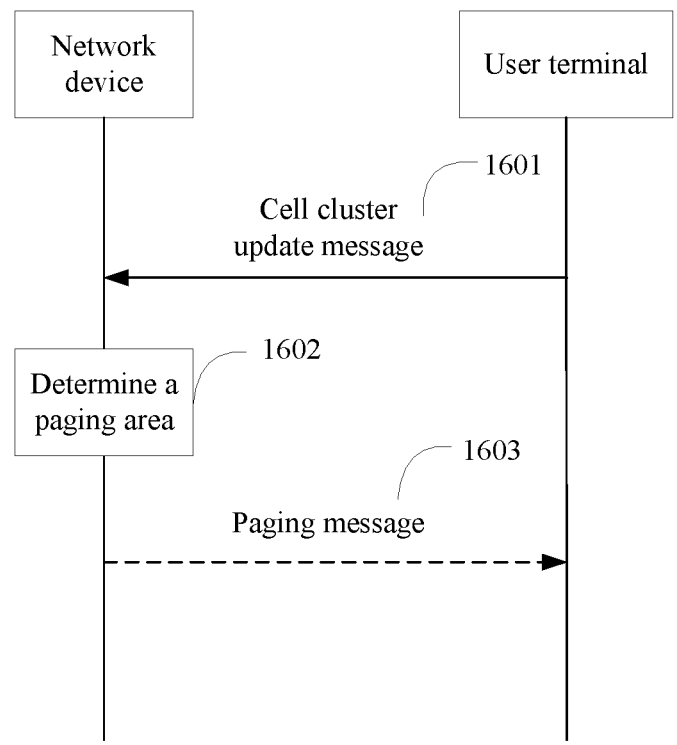
FIG. 16 is a schematic diagram of communication according to an embodiment of the present invention.
Figure 17:
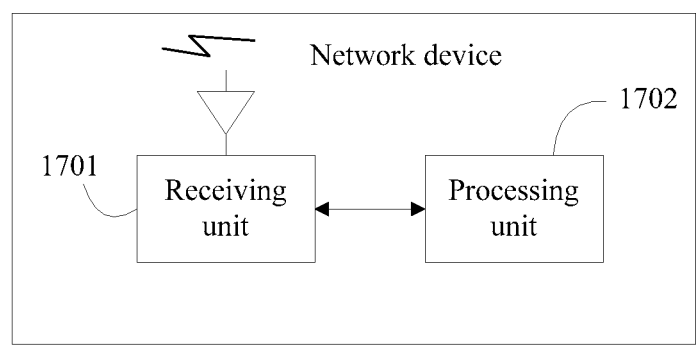
FIG. 17 is a schematic diagram of a network device according to an embodiment of the present invention.

As shown in FIG. 16, this embodiment provides a method for sending a paging message, including the following steps:

1601. A network device receives a cell cluster update message, where the cell cluster update message indicates a cell cluster used by a user terminal, and the cell cluster includes a set of at least one cell.

1602. The network device determines a paging area based on the cell cluster update message, where the paging area includes an area of a cell in the cell cluster indicated by the cell cluster update message.

By using the cell cluster update message, the network device can know the cell cluster used by the user terminal, so as to know an area in which the paging message of the user terminal is to be sent.

Optionally, the determining, by the network device, a paging area based on the cell cluster update message includes: determining, by the network device based on the cell cluster update message, a cell cluster that needs to send a paging message; determining, by the network device, the cell cluster that needs to send the paging message, and information about a TA, where the TA is a tracking area of the network device; and determining, by the network device, the paging area, where the paging area is an intersection area of the TA and the cell cluster.

Because the network device considers the intersection area of the cell cluster and the tracking area, an area for sending the paging message can be reduced, so that an operation may be more effectively or accurately or faster, thereby saving resources.

Optionally, the method further includes step 1603: The network device uses the paging area to send a paging message. Because the cell cluster of the user terminal is considered for the paging area, when a connection is established to the user terminal in the paging area, an operation may be more effectively or accurately or faster, thereby saving resources.

Optionally, the paging message sent by the network device to a base station device includes the area of the cell in the cell cluster indicated by the cell cluster update message.

Optionally, in this method, the update message carries information about a cell cluster of the user, where the information about the cell cluster includes an identifier or an index of the cell cluster. The identifier or the index of the cell cluster is allocated in a uniform manner within a management area of the network device, or allocated in a partially uniform manner within a management area of the network device, or allocated in a uniform manner within a local area. It may be understood that the network device may be a mobility management entity (MME) or a similar entity. One MME may manage a plurality of base station devices, an identifier or an index of a cell cluster may be allocated in a uniform manner within a management area of the MME. If MMEs are also grouped into an MME group, in the MME group, an identifier or an index of a cell cluster may be allocated in a uniform manner within a management area corresponding to the MME group. Certainly, the identifier or the index of the cell cluster may be allocated in a uniform manner in an area of several adjacent base stations, which is also referred to as a local area. The information about the cell cluster is allocated in a uniform manner within the foregoing different management areas, and paging can be initiated flexibly in different areas, so that an operation may be more effectively or accurately or faster, thereby saving resources.

Optionally, the user terminal may receive the foregoing paging message, and if necessary, perform related processing, for example, establish a service connection.

It may be understood that the user terminal may send the cell cluster update message to the network device, where the cell cluster update message indicates the cell cluster used by the user terminal.

Optionally, the user terminal may receive the paging message in the paging area, where the paging area includes the area of the cell in the cell cluster indicated by the cell cluster update message. By receiving the paging message, the user terminal can establish a connection to the cell. Further, the user terminal may receive the paging message in the paging area, where the paging area is an intersection area of the TA of the network device and the cell cluster.

Optionally, to reduce load of sending a paging message by a base station and try to avoid reading, by a user, a large amount of paging messages unrelated to the user, when UE updates a cell cluster, the UE sends a cell cluster update message to an MME. Optionally, the update message carries information about the cell cluster of the user. It is assumed herein that an index of the cell cluster is allocated in a uniform manner within a management area of the MME, or is allocated in a partially uniform manner within a management area of the MME, or is allocated in a uniform manner within a local area. In this way, the paging area is reduced from the TA area to the intersection area of the TA and the cell cluster. A cell cluster classification manner complies with or uses the foregoing specifications of the cell cluster and definition manners of the information about a cell cluster, and details are not described herein again. When the MME determines that paging needs to be performed on the user equipment, the paging message may be sent to a base station device in the intersection area of the TA and the cell cluster. Optionally, the paging message carries information about the cell cluster of the user. The base station device receives the paging message, and performs paging on a user terminal in an area of the base station device based on the paging message. In this way, after receiving the paging message sent by the base station device, the user terminal may rapidly establish a connection between the network device and the user terminal.

Correspondingly, this embodiment provides a network device, including:

a receiving unit (1701), configured to receive a cell cluster update message, where the cell cluster update message indicates a cell cluster used by a user terminal, and the cell cluster includes a set of at least one cell; and a processing unit (1702), configured to determine a paging area based on the cell cluster update message, where the paging area includes an area of a cell in the cell cluster indicated by the cell cluster update message.

By using the cell cluster update message, the network device can know the cell cluster used by the user terminal, so as to know an area in which paging is to be performed on the user terminal.

Optionally, that a processing unit is configured to determine a paging area includes:

the processing unit is configured to determine, based on the cell cluster update message, a cell cluster that needs to send a paging message;

the processing unit is configured to determine the cell cluster that needs to send the paging message, and information about a TA, where the TA is a tracking area of the network device; and the processing unit is configured to determine the paging area, where the paging area is an intersection area of the TA and the cell cluster.

Because the network device considers the intersection area of the cell cluster and the tracking area, the paging area can be reduced, so that an operation may be more effectively or accurately or faster, thereby saving resources.

Optionally, the network device includes a sending unit (which is not shown), configured to use the paging area to send a paging message. Because the cell cluster of the user terminal is considered for the paging area, when the paging message of the user terminal is sent only to a base station device in the paging area, an operation may be more effectively or accurately or faster, thereby saving resources.

Optionally, the update message carries information about a cell cluster of the user, where the information about the cell cluster includes an identifier or an index of the cell cluster. The identifier or the index of the cell cluster is allocated in a uniform manner within a management area of the network device, or allocated in a partially uniform manner within a management area of the network device, or allocated in a uniform manner within a local area. The information about the cell cluster is allocated in a uniform manner within the foregoing different management areas, and paging can be initiated flexibly in different areas, so that an operation may be more effectively or accurately or faster, thereby saving resources.

Correspondingly, it may be understood that the user terminal may change a cell cluster of the user terminal, and need to use a manner to notify the network device that the cell cluster of the user terminal has changed or notify the user terminal of a used cell cluster. After learning the information, the corresponding network device may correspondingly adjust network settings of the network device, for example, a paging area. When subsequent processing is required, for example, when paging is initiated, correct resources are used, so as to maintain communication.

Figure 18:
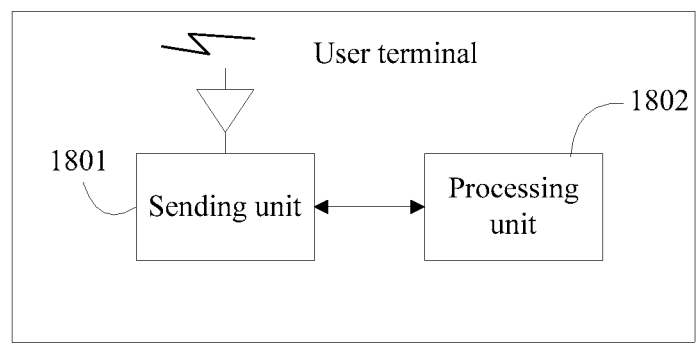
FIG. 18 is a schematic diagram of a user terminal according to an embodiment of the present invention.

As shown in FIG. 18, this embodiment provides a user terminal, including:

a processing unit (1802), configured to determine a cell cluster update message, where the cell cluster update message indicates a cell cluster used by the user terminal, and the cell cluster includes a set of at least one cell; and a sending unit (1801), configured to send the cell cluster update message.

The cell cluster update message may be used to notify the network device of the cell cluster used by the user terminal.

Optionally, the user terminal includes a receiving unit, configured to receive a paging message in a paging area, where the paging area includes an area of a cell in the cell cluster indicated by the cell cluster update message. By receiving the paging message, the user terminal can establish a connection to the cell.

Further, the user terminal includes a receiving unit, configured to receive a paging message in a paging area, where the paging area is an intersection area of a TA of the network device and the cell cluster. By receiving the paging message, the user terminal can establish a connection to the cell. The paging area becomes smaller, and therefore an operation may be more effectively or accurately or faster, thereby saving resources.

Optionally, the update message carries information about a cell cluster of the user, where the information about the cell cluster includes an identifier or an index of the cell cluster. The identifier or the index of the cell cluster is allocated in a uniform manner within a management area of the network device, or allocated in a partially uniform manner within a management area of the network device, or allocated in a uniform manner within a local area.

It should be understood that descriptions such as "first", "second", and "third" in the embodiments of the present invention are merely used to make a reader distinguish nouns more easily, and constitute no limitation on the nouns.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example based on functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

A controller/processor for performing functions of the foregoing network device or user terminal of the present invention may be a central processing unit (CPU), a general purpose processor, a digital signal processor (DSP), an application-specific integrated circuit (ASIC), a field programmable gate array (FPGA) or another programmable logical device, a transistor logic device, a hardware component, or any combination thereof. The above things may implement or execute various example logic blocks, modules, and circuits described with reference to content disclosed in the present invention. Alternatively, the processor may be a combination implementing a computing function, for example, a combination including one or more microprocessors, or a combination of a DSP and a microprocessor.

Figure 14:
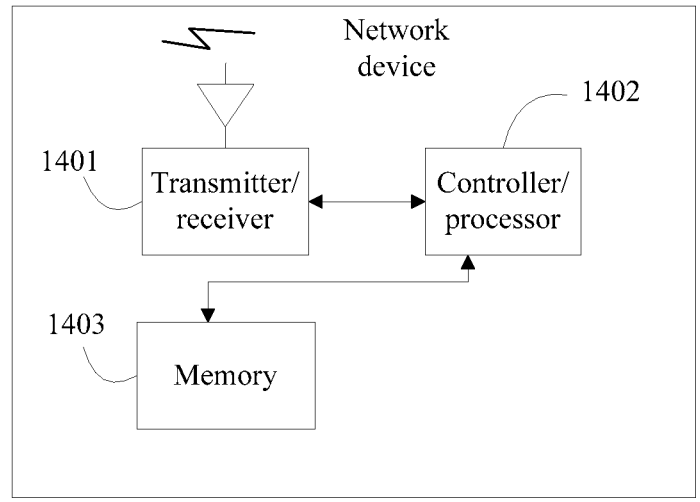
FIG. 14 is a schematic diagram of a network device according to an embodiment of the present invention.

FIG. 14 shows a schematic diagram of a possible structure of the network device in the foregoing embodiments.

An access network device includes a transmitter/receiver 1401, a controller/processor 1402, and a memory 1403. The transmitter/receiver 1401 is configured to support information transceiving between the network device and the user terminal in the foregoing embodiments. The controller/processor 1402 performs various functions for communication with the user terminal. In an uplink, an uplink signal from the user terminal is received by using an antenna, demodulated by using the receiver 1401, and further processed by using the controller/processor 1402 to restore service data and signaling that are sent by the user terminal. In a downlink, service data and a signaling are processed by using the controller/processor 1402, and demodulated by using the transmitter 1401 to generate a downlink signal, and the downlink signal is transmitted to the user terminal by using the antenna. The controller/processor 1402 further performs processing processes related to the network device in a plurality of the foregoing embodiments and/or other processes for the technologies described in the embodiments of this application. The memory 1403 is configured to store program code and data of the network device. It may be understood that FIG. 14 merely shows a simplified design of the network device. In practical application, the network device may include any quantity of transmitters, receivers, processors, controllers, memories, communications units, and the like, and all network devices that can implement the present invention shall fall within the protection scope of the present invention.

Figure 15:
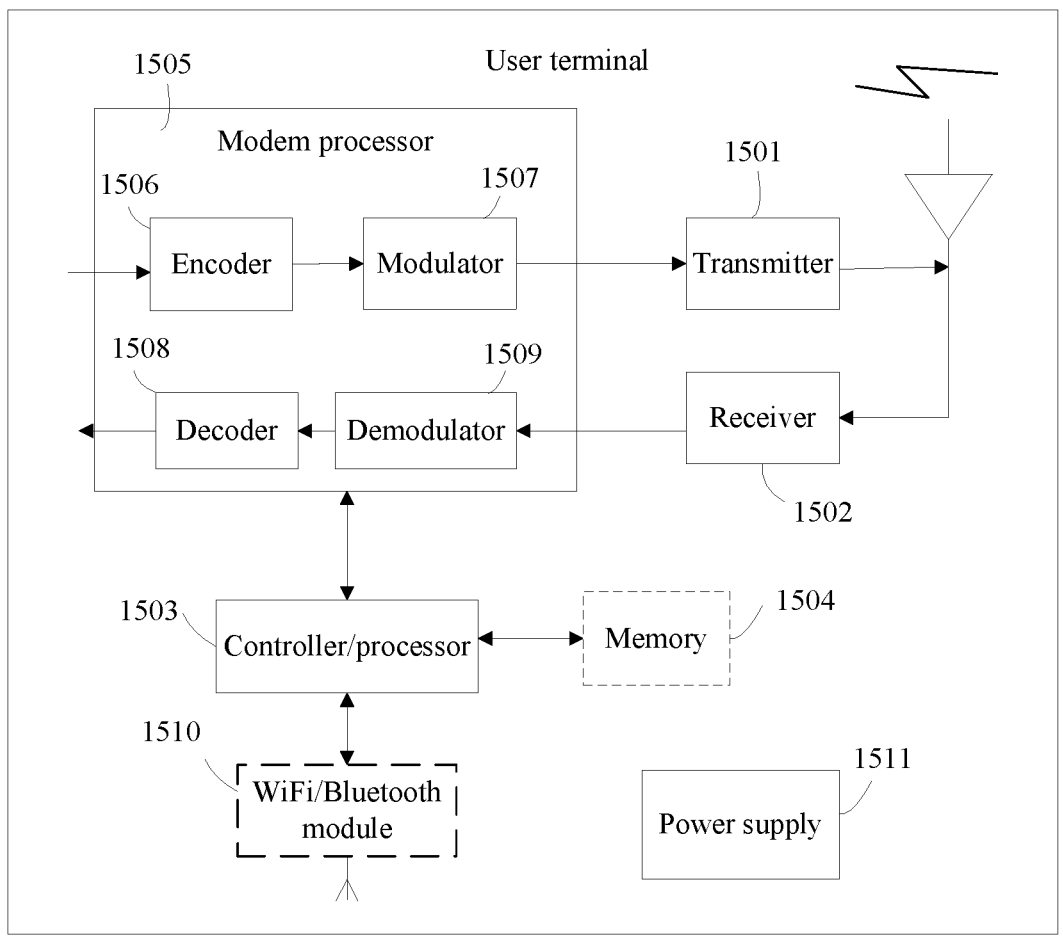
FIG. 15 is a schematic diagram of a user terminal according to an embodiment of the present invention.

FIG. 15 is a simplified schematic diagram of a possible design structure of a user terminal in the foregoing embodiments. The user terminal includes a transmitter 1501, a receiver 1502, a controller/processor 1503, a memory 1504, a modem processor 1505, a WiFi and/or Bluetooth module 1510, a power supply 1511, and the like.

The transmitter 1501 adjusts (for example, through analog conversion, filtering, amplification, or up-conversion) the output sampling, and generates an uplink signal, and the uplink signal is transmitted to the network device in the foregoing embodiments by using an antenna. In a downlink, the antenna receives a downlink signal transmitted by the network device in the foregoing embodiments. The receiver 1502 adjusts (for example, through filtering, amplification, down-conversion, or digitalization) a signal received from the antenna, and provides an input sampling. In the modem processor 1505, an encoder 1506 receives service data and a signaling that are to be sent in an uplink, and processes (for example, through formatting, coding, or interleaving) the service data and the signaling message. A modulator 1507 further processes (for example, through symbol mapping or modulation) encoded service data and an encoded signaling message, and provides an output sampling. A demodulator 1509 processes (for example, through demodulation) the input sampling and provides symbol estimation. A decoder 1508 performs processing (for example, de-interleaving or decoding). The encoder 1506, the modulator 1507, the demodulator 1509, and the decoder 1508 may be implemented by using the combined modem processor 1505. These units perform processing based on a radio access technology (for example, an access technology of LTE or another evolved system) used by a radio access network.

The WiFi and/or Bluetooth module 1510 may include a receiver and a transmitter for a WiFi signal and/or a Bluetooth signal, and the receiver and the transmitter may implement data transmission with another device having a WiFi function and/or a Bluetooth function.

The power supply 1511 (for example, a battery) is responsible for supplying power to each component. The power supply may be logically connected to the controller/processor 1503 by using a power supply management system, so that functions such as management on charging, discharging, and power consumption are implemented by using the power supply management system.

The controller/processor 1503 performs control and management on an action of the user terminal, and is configured to perform the processing performed by the user terminal in the foregoing embodiments. For example, the controller/processor 1503 is configured to perform a function of the foregoing processing unit. The memory 1504 is configured to store program code and data of the user terminal. Based on software and hardware conditions, some or all of the functions of the foregoing processing unit may alternatively be completed by the modem 1505 and components (such as 1506, 1507, 1508, and 1509) of the modem 1505, or may be completed by a combination of the modem 1505 and components of the modem 1505, and the controller/processor 1503.

It may be understood that components such as the foregoing WiFi and/or Bluetooth module 1510 and power supply 1511 may be omitted based on a required environment, because in some cases, lack of these components does not hinder completion of the embodiments of the present invention.

Steps of methods or algorithms described in the embodiments disclosed in this specification may be implemented by hardware, a software module executed by a processor, or a combination thereof. The software module may be configured in a random access memory (RAM), a memory, a read-only memory (ROM), an electrically programmable ROM, an electrically erasable programmable ROM, a register, a hard disk, a removable disk, a CD-ROM, a nonvolatile memory, or any other form of storage medium known in the art.

In the foregoing specific implementations, the objective, technical solutions, and benefits of the present invention are further described in detail. It should be understood that the foregoing descriptions are merely specific implementations of the present invention, but are not intended to limit the protection scope of the present invention. Any modification, equivalent replacement, or improvement made without departing from the spirit and principle of the present invention should fall within the protection scope of the present invention.

What is claimed is:

1. A method for processing a system message, comprising:
   obtaining, by a user terminal, a first system information block;
   when identification information of a cell cluster does not appear in the first system information block, determining, by the user terminal, that a system information of the cell cluster has changed;
   when the identification information of the cell cluster appears in the first system information block:
   obtaining, by the user terminal, from the first system information block, identification information of the cell cluster, wherein the cell cluster is a set of cells having a same attribute;
   determining, by the user terminal, a value of the identification information;
   determining, by the user terminal, that the value of the identification information is different from a value of previously obtained identification information of another cell cluster;
   based on the determining that the value of the identification information is different from a value of previously obtained identification information, reading, by the user terminal, a second system information block, the second system information block is a system information block of the cell cluster; and
   updating system information on the user terminal based on the second system information block.

2. The method according to claim 1, wherein the second system information block comprises at least one piece or a combination of characteristic information of the cell cluster, public information of the cell cluster, access information of the cell cluster, or another system message of the cell cluster.

3. The method according to claim 1, wherein the identification information includes an index number of the cell cluster.

4. A terminal device, comprising:
   at least one processor; and
   a non-transitory memory, wherein the memory stores an execution instruction, wherein the execution instruction instructs the at least one processor to:
   obtain a first system information block;
   when identification information of a cell cluster does not appear in the first system information block, determine that a system information of the cell cluster has changed;
   when the identification information of the cell cluster appears in the first system information block:
   obtain from the first system information block, identification information of the cell cluster, wherein the cell cluster is a set of cells having a same attribute;
   determine a value of the identification information;
   determine that the value of the identification information is different from a value of previously obtained identification information of another cell cluster;
   based on the determining that the value of the identification information is different from a value of previously obtained identification information, reading, by the user terminal, a second system information block, the second system information block is a system information block of the cell cluster; and
   update system information on the user terminal based on the second system information block.

5. The terminal device according to claim 4, wherein the second system information block comprises at least one piece or a combination of characteristic information of the cell cluster, public information of the cell cluster, access information of the cell cluster, or another system message of the cell cluster.

6. The terminal device according to claim 4, the identification information includes an index number of the cell cluster.

* * * * *